US012395859B2

(12) United States Patent
Hong

(10) Patent No.: US 12,395,859 B2
(45) Date of Patent: Aug. 19, 2025

(54) MEASUREMENT METHOD, BASE STATION, AND MULTI-MODE TERMINAL

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 386 days.

(21) Appl. No.: 18/012,812

(22) PCT Filed: Jun. 28, 2020

(86) PCT No.: PCT/CN2020/098629
§ 371 (c)(1),
(2) Date: Dec. 23, 2022

(87) PCT Pub. No.: WO2022/000144
PCT Pub. Date: Jan. 6, 2022

(65) Prior Publication Data
US 2023/0254706 A1 Aug. 10, 2023

(51) Int. Cl.
H04W 16/26 (2009.01)
H04W 76/27 (2018.01)
H04W 88/06 (2009.01)

(52) U.S. Cl.
CPC ........... H04W 16/26 (2013.01); H04W 76/27 (2018.02); H04W 88/06 (2013.01)

(58) Field of Classification Search
CPC ..... H04W 16/26; H04W 24/02; H04W 24/10; H04W 76/27; H04W 84/06; H04W 88/06

USPC ........................................................ 455/427
See application file for complete search history.

(56) References Cited

U.S. PATENT DOCUMENTS

| 12,101,166 B2 * | 9/2024 | Schmidt ............ H04W 36/0085 |
| 2017/0230104 A1 * | 8/2017 | Purkayastha ......... H04W 48/20 |
| 2021/0400556 A1 * | 12/2021 | Määttanen .......... H04W 36/324 |

FOREIGN PATENT DOCUMENTS

| CN | 115022933 A | * | 9/2022 | ........ H04W 36/0066 |
| EP | 2365646 A1 | | 9/2011 | |
| EP | 2704471 A2 | | 3/2014 | |
| WO | WO 03019835 A1 | | 3/2003 | |
| WO | WO 2005010549 A2 | | 2/2005 | |
| WO | WO 2019170866 A1 | | 9/2019 | |
| WO | WO 2020076220 A1 | | 4/2020 | |

OTHER PUBLICATIONS

PCT/CN2020/098629 English translation of International Search Report dated Mar. 25, 2021, 2 pages.
European Patent Application No. 20942557.8, Search and Opinion dated Feb. 27, 2024, 9 pages.

* cited by examiner

Primary Examiner — Hirdepal Singh
(74) Attorney, Agent, or Firm — Cozen O'Connor

(57) ABSTRACT

A method for measuring a satellite network is performed by a base station which sends a measurement configuration signaling to a multi-mode terminal. The measurement configuration signaling includes configuration information for the multi-mode terminal to measure the satellite network.

11 Claims, 11 Drawing Sheets

MEASUREMENT METHOD, BASE STATION, AND MULTI-MODE TERMINAL

CROSS-REFERENCE TO RELATED APPLICATION

This application is the US national phase application of International Application No. PCT/CN2020/098629, filed on Jun. 28, 2020, the entire contents of which are incorporated herein by reference for all purposes.

TECHNICAL FIELD

The present disclosure relates to but not limited to the field of wireless communication technologies, and particularly to a method for measuring a satellite network, a base station, a multi-mode terminal, a communication device and a storage medium.

BACKGROUND

In connection with the evolution of standardization of the 5th-Generation (5G) mobile communication technology and the rapid deployment of 5G mobile communication technology wireless network, mobile communication technologies have developed rapidly. In the related art, because the total number of communication satellites is relatively small, signal coverage of the satellite network is discontinuous, and coverage may vary with the movement of the communication satellites.

SUMMARY

A method for measuring a satellite network is disclosed in embodiments of the present disclosure. In one aspect, the method is applied to a base station. The method includes:
sending a measurement configuration signaling to a multi-mode terminal; in which, the measurement configuration signaling includes configuration information for the multi-mode terminal to measure the satellite network.

According to a second aspect of embodiments of the present disclosure, a method for measuring a satellite network is provided. The method is applied to a multi-mode terminal. The method includes:
receiving a measurement configuration signaling sent by abase station; in which, the measurement configuration signaling includes configuration information for the multi-mode terminal to measure the satellite network.

According to a fifth aspect of embodiments of the present disclosure, a communication device is provided, and includes:
a processor; and
a memory configured to store instructions executable by the processor;
the processor is configured to: implement the method as described in any embodiment when running the executable instructions.

DETAILED DESCRIPTION

The embodiments will be described in detail here, and examples thereof are shown in the accompanying drawings. When the following descriptions refer to the accompanying drawings, unless otherwise indicated, the same numbers in different drawings represent the same or similar elements. The implementations described in the following embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a"", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "if" as used herein may be interpreted as "in a case that" or "when" or "in response to determining".

The terms used herein are "greater than" or "less than" when representing a size relationship for purposes of conciseness and ease of understanding. However, it is understandable for those skilled in the art that the term "greater than" covers the meaning of "greater than or equal to", and "less than" covers the meaning of "less than or equal to".

Figure 1:
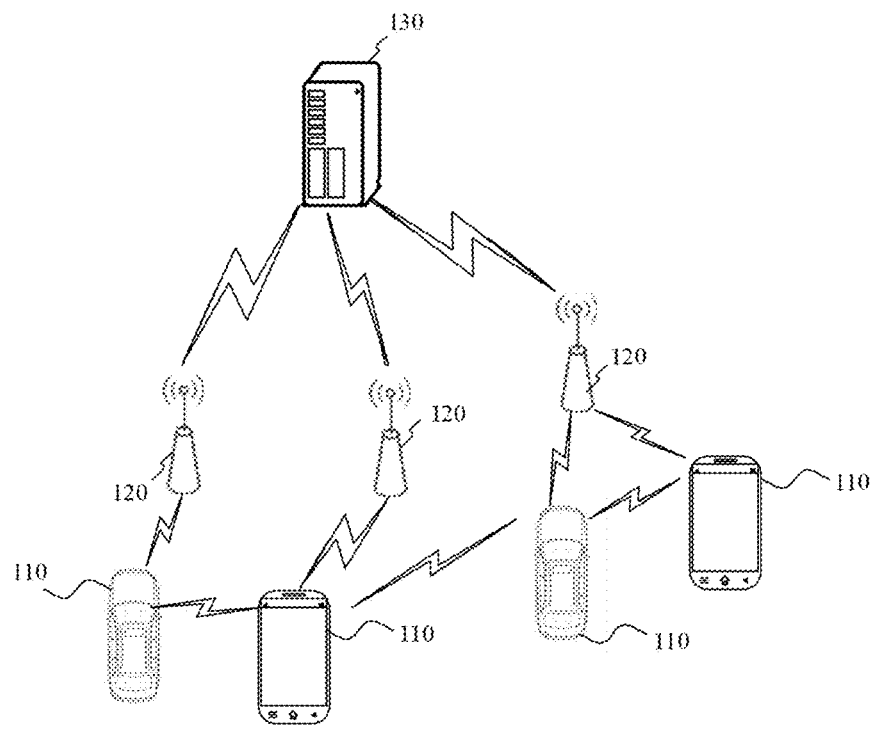
FIG. 1 is a diagram illustrating a structure of a wireless communication system.

FIG. 1 is a diagram illustrating a structure of a wireless communication system in embodiments of the present disclosure. As illustrated in FIG. 1, a wireless communication system is a communication system based on a cellular mobile communication technology. The wireless communication system may include several user equipments 110 and several base stations 120.

The user equipment 110 may refer to a device that provides voice and/or data connectivity for a user. The user equipment 110 may communicate with one or more core networks through a radio access network (RAN). The user equipment 110 may be an internet of things user equipment, for example, a sensor device, a mobile phone (or referred to as a cellular phone) and a computer having an internet of things user equipment, for example, may be a fixed, portable, compact, handheld, computer built-in or vehicle apparatus, for example, a station (STA), a subscriber unit, a subscriber station, a mobile station, a mobile, a remote station, an access point, a remote terminal, an access terminal, an access terminal, a user terminal, a user agent, a user device or a user equipment (UE). Or, the user equipment 110 may be a device of an unmanned vehicle. Or, the user equipment 110 also may be a vehicle device, for example, may be a vehicle computer with a wireless communication function, or a wireless user equipment externally connected to a vehicle computer. Or, the user equipment 110 also may be a roadside device, for example, may be a street lamp, a signal lamp or other roadside device with a wireless communication function.

The base station 120 may be a network side device in the wireless communications system. The wireless communication system may be a 4th generation mobile communication (4G) system, also referred to as a long term evolution (LTE) system; or the wireless communications system may be a 5G system, also referred to as a new radio (NR) system or a 5G NR system. Or, the wireless communication system may be a next generation system of a 5G system. An access network in the 5G NR system may be referred to as a new generation-radio access network (NG-RAN).

The base station 120 may be an eNB adopted in a 4G system. Or, the base station 120 may be a base station with a centralized distributed architecture (gNB) in a 5G system. When the base station 120 adopts a centralized distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in a CU; a physical (PHY) layer protocol is configured in a DU. The specific implementation of a base station 120 is not limited in embodiments of the disclosure.

The base station 120 may establish a wireless connection with the user equipment 110 through a wireless air interface. In different implementations, the wireless air interface is a wireless air interface based on a 4G standard; or, the wireless air interface is a wireless air interface based on a 5G standard, for example, the wireless air interface is a new air interface; or, the wireless air interface may be a wireless air interface based on a next generation mobile communication network technology standard of a 5G.

In some embodiments, an end to end (E2E) connection further may be established between user equipment 110, for example, in scenes such as vehicle to vehicle (V2V) communication, vehicle to infrastructure (V2I) communication and vehicle to pedestrian (V2P) communication in vehicle to everything (V2X).

The above user equipment may be referred to as terminal devices in the following embodiments.

In some embodiments, the wireless communication system may further include a network management device 130. Several base stations 120 may be connected with the network management device 130. The network management device 130 may be a core network device in the wireless communication system. For example, the network management device 130 may be a mobility management entity (MME) in an evolved packet core (EPC). Or, the network management device may be other core network devices, for example, a Serving GateWay (SGW), a Public Data Network GateWay (PGW), a Policy and Charging Rules Function (PCRF) or a Home Subscriber Server (HSS), etc. The implementation form of the network management device 130 is not limited in the embodiments of the disclosure.

In order to facilitate understanding of any embodiment of the disclosure, a wireless communication network is explained first.

Satellite communication may be communication between radio communication stations on the ground by taking a communication satellite as a relay station to forward radio waves. Communication functions of the communication satellite include at least one of: receiving a signal, changing a frequency of a signal, amplifying a signal, forwarding a signal and positioning.

Figure 2:
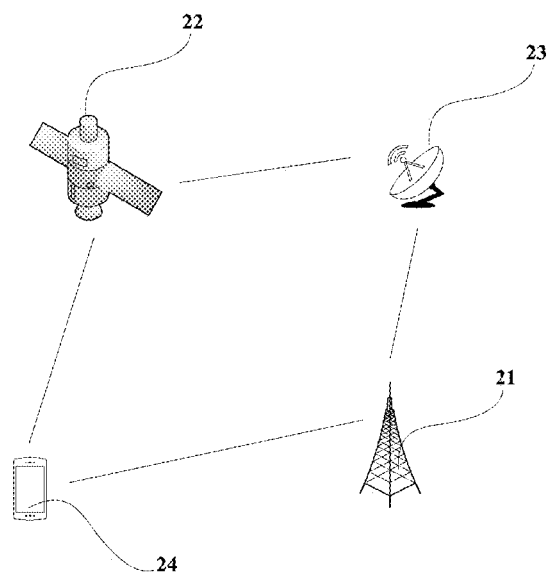
FIG. 2 is a diagram illustrating a structure of a wireless communication system according to an embodiment.

In an embodiment, as illustrated in FIG. 2, the wireless communication network may be a network that integrates a mobile communication network with a satellite communication network. The mobile communication network includes a base station 21; the satellite communication network includes a communication satellite 22 and a gateway 23 of the communication satellite.

In an embodiment, the base station 21 may establish a communication connection with the gateway 23. A terminal 24 may establish a wireless communication connection with the base station 21. The terminal 24 may establish a wireless communication connection with the satellite 22. The terminal 24 may be a multi-mode terminal, and the multi-mode terminal is a terminal that supports both wireless communication with the satellite 22 and wireless communication with the base station 21.

Figure 3:
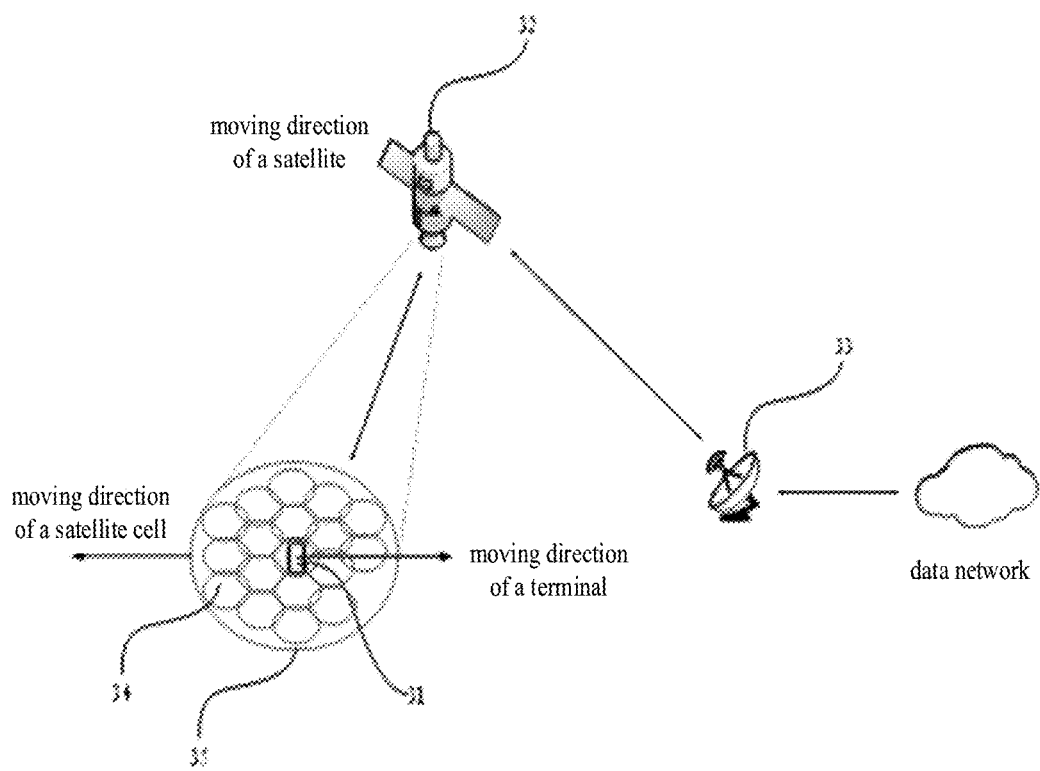
FIG. 3 is a diagram illustrating a structure of a wireless communication system according to an embodiment.

In an embodiment, as illustrated in FIG. 3, the wireless communication network includes a terminal 31, a communication satellite 32 and a gateway 33. An area 34 is a signal coverage area of an antenna on the satellite, and an area 35 is a satellite cell of the communication satellite 32.

In an embodiment, a moving direction of the satellite is leftward, and a moving direction of the satellite cell is leftward following the moving direction of the satellite. A moving direction of the terminal is opposite to the moving direction of the satellite, and is rightward. In this case, as illustrated in FIG. 3, the relative distance between the terminal 31 and the communication satellite 32 is becoming closer in a horizontal direction.

In an embodiment, the moving direction of the satellite is rightward, and the moving direction of the satellite cell is rightward following the moving direction of the satellite. The moving direction of the terminal is opposite to the moving direction of the satellite, and is leftward. In this case, the relative distance between the terminal 31 and the communication satellite 32 is becoming farther in the horizontal direction.

Figure 4:
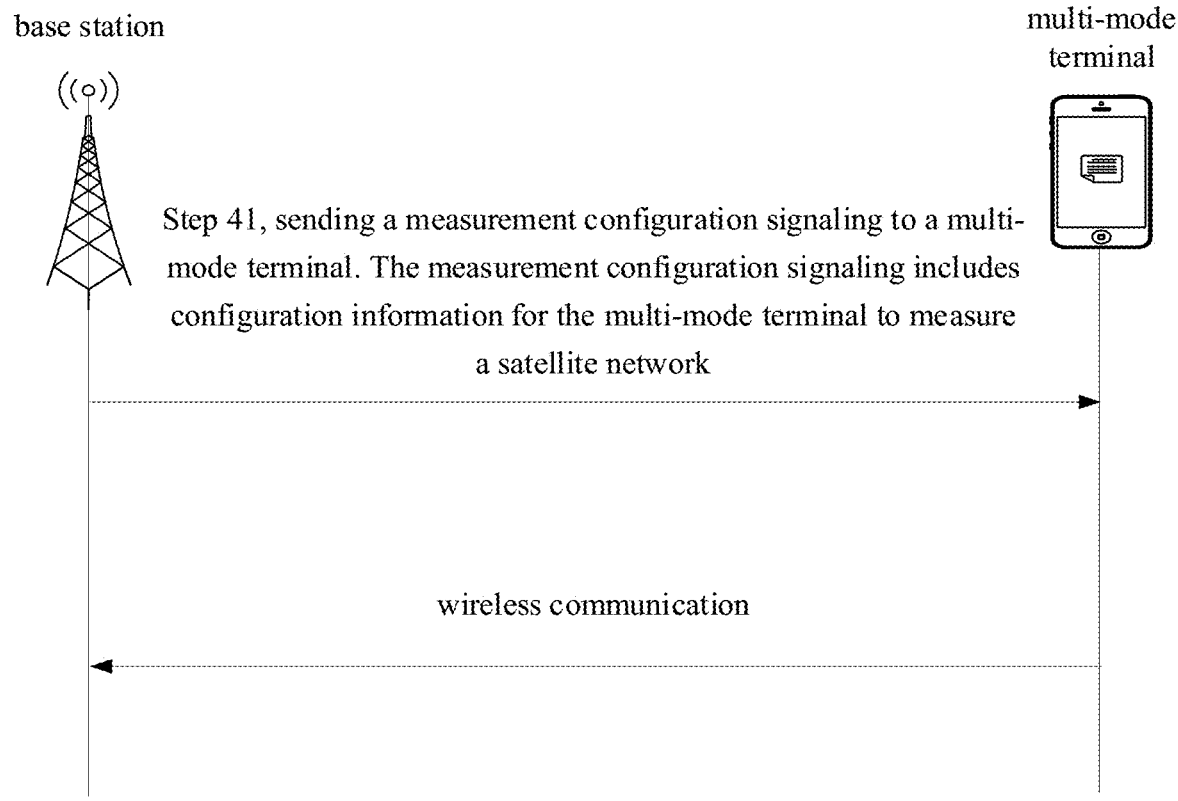
FIG. 4 is a flowchart illustrating a method for measuring a satellite network according to an embodiment.

As illustrated in FIG. 4, a method for measuring a satellite network is provided in the embodiment. The method is applied to a base station. The method includes:

step 41, sending a measurement configuration signaling to a multi-mode terminal. The measurement configuration signaling includes configuration information for the multi-mode terminal to measure a satellite network.

The multi-mode terminal may be a terminal that not only supports wireless communication with the satellite but also supports wireless communication with the base station.

The multi-mode terminal may be but not limited to a mobile phone, a wearable device, a vehicle terminal, a road side unit (RSU), a smart home terminal, an industrial sensing device and/or a medical device.

The base station is an interface device for the multi-mode terminal to access the network. The base station may be various types of base stations, for example, a 3G base station, a 4G base station, a 5G base station or other evolutionary base station.

In an embodiment, the satellite network may be deployed in an airspace where a density of ground base stations is less than a density threshold and a strength of a wireless communication signal is less than a strength threshold, for example, the airspace where a remote mountainous area or an ocean is located.

In an embodiment, when the signal strength of the signal received by the multi-mode terminal from the bases station is greater than a signal threshold, the multi-mode terminal establishes the wireless communication connection with the base station; and when the signal strength of the signal received by the multi-mode terminal from the base station and a neighboring base station is less than the signal threshold, the multi-mode terminal establishes the wireless communication connection with the satellite. In a good channel environment, a threshold condition for establishing the connection with the base station may be satisfied first, and the multi-mode terminal may preferentially select to establish the wireless communication connection with the base station. In this way, an unnecessary wireless communication connection between the multi-mode terminal and the satellite and satellite network resources occupied are reduced when there is a base station available for the multi-mode terminal to establish a connection. The multi-mode terminal may establish the wireless communication connection with the satellite network when there is no suitable base station for the multi-mode terminal to establish a connection, thereby ensuring the wireless communication quality of the multi-mode terminal.

In an embodiment, the base station may send the measurement configuration signaling to the multi-mode terminal in a unicast mode.

In another embodiment, the base station may send the measurement configuration signaling to the multi-mode terminal in a broadcast mode.

In an embodiment, the measurement configuration signaling may be an existing radio resource control (RRC) signaling carrying configuration information. In this way, the configuration information is carried in the existing radio resource control (RRC) signaling, which achieves multiplexing of the radio resource control (RRC) signaling, and improves compatibility of the signaling.

In an embodiment, the base station may periodically send the measurement configuration signaling to the multi-mode terminal. The multi-mode terminal may acquire updated configuration information in time when the configuration information is updated constantly. For example, the base station periodically sends the measurement configuration signaling to the terminal, then in a certain period, if the configuration information of the base station is updated, the base station may send the updated configuration information to the multi-mode terminal in the certain period. In this way, the multi-mode terminal can acquire the updated configuration information in time in the certain period.

In an embodiment, the base station may receive a measurement result acquired by the multi-mode terminal measuring using the configuration information. The base station may adjust a signal coverage of the satellite network based on the measurement result. The base station adjusts the signal coverage of the satellite network may be that the base station sends a control instruction for controlling adjustment of the signal coverage of the satellite network to the satellite network. The base station adjusts the signal coverage of the satellite network also may be that the base station sends a control instruction for controlling adjustment of the coverage of the satellite network to a satellite control center. The satellite control center may forward the control instruction to the satellite network after receiving the control instruction sent by the base station. The control instruction may be configured to control the satellite to increase a power of a satellite transmission signal, change a trajectory of a satellite, adjust a signal transmission direction of a satellite antenna, etc. In an embodiment, increasing the power of the satellite transmission signal may be increasing the transmission power of the satellite to greater than a set transmission power.

In an embodiment, the base station sends the measurement configuration signaling to the multi-mode terminal, and the multi-mode terminal acquires the measurement result by measuring the satellite network using the configuration information included in the measurement configuration signaling. The base station may adjust the signal strength of the satellite based on the measurement result. For example, the multi-mode terminal may measure a satellite in a preset area indicated by the configuration information after receiving the measurement configuration signaling. The multi-mode terminal may send the measurement result to the base station in response to detecting that the signal strength of the satellite in the preset area is less than a set strength threshold, and the base station may increase the signal transmission power of the satellite in response to determining that the satellite signal strength is less than the set strength threshold based on the measurement result. In this way, the wireless signal strength received by the multi-mode terminal may be greater, which may ensure the wireless communication quality of the multi-mode terminal. In an embodiment, the base station may adjust the direction of the satellite transmission signal based on the measurement result. For example, the multi-mode terminal may measure the satellite in the preset area indicated by the configuration information after receiving the measurement configuration signaling. The multi-mode terminal may send the measurement result to the base station in response to detecting that the signal strength of the satellite in the preset area is less than the set strength threshold, and the base station may adjust the signal transmission angle of the antenna in response to determining that the satellite signal strength is less than the set strength threshold based on the measurement result, so that the direction of the transmission signal of the antenna is aligned with the multi-mode terminal. In this way, the wireless signal strength received by the multi-mode terminal may be greater, which may ensure the wireless communication quality of the multi-mode terminal.

In an embodiment, the satellite network may be a communication network at least including a plurality of communication satellites in the airspace. The multi-mode terminal may access the satellite network via the communication satellite for mobile wireless communication. Communication functions of the communication satellite include at least one of: receiving a signal, forwarding a signal and positioning.

In an embodiment, the measurement configuration signaling is sent to the multi-mode terminal in response to establishing the RRC connection with the satellite when the multi-mode terminal is powered on. In this way, after the multi-mode terminal measures the signal of the satellite network using the configuration information included in the measurement configuration signaling, the multi-mode terminal may select a satellite with the signal strength of the wireless communication greater than a set threshold for access based on the signal measurement result. For example, the multi-mode terminal measures the satellite network using a preset space indicated by the configuration information, and measures three satellites in the preset space, which are respectively a satellite 1, a satellite 2 and a satellite 3. The multi-mode terminal measures that the signal strength of the satellite 1 is greater than the signal strength of the satellite 2 and the signal strength of the satellite 3, in this case, the multi-mode terminal may select to establish the wireless communication connection with the satellite 1, so that the wireless communication quality of the satellite may be ensured.

In an embodiment, the base station may send the measurement configuration signaling to the multi-mode terminal after the multi-mode terminal accesses the satellite network. The multi-mode terminal may switch to a satellite with a good wireless communication quality according to the measurement result after measuring the satellite network using the configuration information included in the measurement configuration signaling. For example, the multi-mode terminal has established a wireless communication connection with the satellite 1, and the base station may send the measurement configuration signaling to the multi-mode terminal. The multi-mode terminal may measure the satellite in the preset area indicated by the configuration information after receiving the measurement configuration signaling. The multi-mode terminal may select to switch to establish a wireless communication connection with the satellite 2 in response to detecting that the signal strength of the satellite 2 is greater than the signal strength of the satellite 1 in the preset area. In this way, the wireless communication quality of the satellite may be ensured.

In an embodiment, the base station sends the measurement configuration signaling to the multi-mode terminal in response to that the multi-mode terminal establishes the RRC connection with the base station. In this way, the multi-mode terminal may measure the satellite network based on the configuration information, and select a satellite with the signal strength greater than the strength threshold for access based on the measurement result.

In an embodiment, when the multi-mode terminal establishes the radio resource control (RRC) connection with the base station, the multi-mode terminal sends an acquisition request for configuration information to the base station, and the base station sends the configuration information associated with the acquisition request to the multi-mode terminal after receiving the acquisition request. The multi-mode terminal may periodically send the acquisition request to the base station until the configuration information associated with the acquisition request fed back by the base station is received. In this way, the situation that the base station cannot receive the acquisition request due to the poor wireless communication environment with the base station is reduced, and the reliability of transmission of the acquisition request is improved.

In an embodiment, the base station sends the configuration information associated with the acquisition request to the multi-mode terminal, in response to receiving the acquisition request for the configuration information sent by the multi-mode terminal after receiving a trigger instruction from a user. For example, when the multi-mode terminal works in a remote mountainous area, the density of base stations is small, and the signal coverage is poor, which results in that the strength is less than the signal threshold, and the multi-mode terminal often fails to connect a network, and needs to access the satellite network. In this case, the multi-mode terminal may be triggered to send the acquisition request for the configuration information to the base station. The satellite may send the configuration information associated with the acquisition request to the multi-mode terminal after receiving the acquisition request. In this way, the terminal can acquire the measurement result by measuring the satellite network using the configuration information, and send the measurement result to the base station. The base station adjusts the power of the satellite transmission signal based on the measurement result. For example, the strength of the satellite transmission signal is adjusted to be greater than the strength threshold. As such, the strength of the satellite transmission signal increases, the signal strength received by the multi-mode terminal may increase, and the multi-mode terminal may select a satellite with a large signal strength for access, to ensure the wireless communication quality of the multi-mode terminal.

In an embodiment, the base station sends the configuration information associated with the acquisition request to the multi-mode terminal, in response to the acquisition request for the configuration information, which is sent by the multi-mode terminal to the base station after detecting that the strength of the wireless communication signal sent by the satellite is less than the signal threshold.

For example, when the multi-mode terminal works in a remote mountainous area, the density of the base station is small, and the signal coverage is poor, which results in that the signal strength is less than the signal threshold, the multi-mode terminal selects to perform wireless communication via the satellite network.

The multi-mode terminal may be triggered to send the acquisition request for configuration information to the base station when the strength of the wireless communication signal detected by the multi-mode terminal is less than the signal threshold. The base station may send the configuration information associated with the acquisition request to the multi-mode terminal after receiving the acquisition request. In this way, the multi-mode terminal may acquire the measurement result by measuring the satellite network using the configuration information, and send the measurement result to the base station. The base station may adjust the signal coverage of the satellite based on the measurement result after receiving the measurement result. Here, adjusting the signal coverage of the satellite may be increasing the power of the satellite transmission signal, changing the trajectory of the satellite and adjusting the signal transmission direction of the satellite antenna, etc.

In an embodiment, the base station sends the configuration information associated with the acquisition request to the multi-mode terminal, in response to receiving the acquisition request for the configuration information sent by the multi-mode terminal to the base station after the multi-mode terminal is powered on. The base station sends the configuration information associated with the acquisition request to the multi-mode terminal after receiving the acquisition request sent by the multi-mode terminal.

In an embodiment, the base station sends the measurement configuration signaling to the multi-mode terminal when the number of loads connected by the base station exceeds a number threshold, in order to relieve the load of the base station.

The multi-mode terminal acquires the measurement result by measuring the satellite network based on the configuration information and send the measurement result to the base station, after receiving the measurement configuration signaling sent by the base station. The base station adjusts the coverage of the satellite network based on the measurement result. In an embodiment, the base station adjusts the coverage of the satellite network may be that the base station sends a control instruction for controlling adjustment of the coverage of the satellite network to the satellite network. In an embodiment, it also may be that the base station sends a control instruction for controlling adjustment of the coverage of the satellite network to the satellite control center. The satellite control center forwards the control instruction to the satellite network after receiving the control instruction sent by the base station. Here, the control instruction may be configured to control the satellite to increase the power of the satellite transmission signal, change the trajectory of the satellite, adjust the signal transmission direction of the satellite antenna, etc. In this way, the multi-mode terminal may establish a wireless communication with the satellite with a good signal strength, which relieves the burden that the number of loads connected to the base station exceeds the number threshold.

The configuration information includes indicating at least one of:
- a measurement object, the measurement object including a satellite, a satellite cell and/or a satellite frequency band;
- measurement time;
- a measurement area;
- a signal parameter required to be measured; and
- information required to be recorded, the information required to be recorded including: a measured duration in which the multi-mode terminal is covered by a satellite cell and/or a measured coverage range of a satellite cell.

In an embodiment, the measurement object may include one or more satellites. For example, in an embodiment, the configuration information carries identity documents (IDs) of satellites, and the multi-mode terminal may measure the satellite indicated by the ID of the satellite after receiving the configuration information. The ID of the satellite is configured to uniquely identify one satellite. For example, the configuration information includes IDs of three measurement objects: ID "001" of satellite A, ID "010" of satellite B, and ID "100" of satellite C, respectively. In an embodiment, a plurality of satellites may be adjacent to each other. In another embodiment, the plurality of satellites may also be a plurality of satellites in a preset airspace, for example, satellites running in airspace A.

In an embodiment, the measurement object may include one or more satellite cells. For example, in an embodiment, the configuration information carries IDs of satellite cells, and the multi-mode terminal may measure the satellite cells indicated by the IDs of the satellite cells after receiving the configuration information. The ID of the satellite cell is configured to uniquely identify one satellite cell. For example, the configuration information includes IDs of three measurement objects: ID "101" of satellite cell C, ID "110" of satellite cell D, and ID "111" of satellite cell E, respectively. Here, a plurality of satellite cells may be a plurality of satellites that are adjacent to each other. In another embodiment, the plurality of satellite cells may be a plurality of satellite cells in a preset area range, for example, satellite cells in a range B.

In an embodiment, the measurement object may include frequency bands of one or more satellites. The frequency band of the satellite is a frequency band for wireless communication between the multi-mode terminal and the satellite. For example, the frequency band for communication between the multi-mode terminal and the satellite A is X1, the frequency band for communication between the multi-mode terminal and the satellite B is X2, and the frequency band for communication between the multi-mode terminal and the satellite C is X3. The configuration information may include three frequency bands X1, X2 and X3, and the multi-mode terminal may measure the signals corresponding to the three frequency bands.

In an embodiment, the measurement object may also include frequency bands of a plurality of antennas included in one satellite. Here, the frequency band of the antenna is a frequency band for communication between the multi-mode terminal and the antenna of the satellite. For example, the communication frequency band for wireless communication between the multi-mode terminal and antenna a of the satellite is s1, the communication frequency band for wireless communication between the multi-mode terminal and antenna b of the satellite is s2, and the communication frequency band for wireless communication between the multi-mode terminal and antenna c of the satellite is s3. The configuration information may include three frequency bands s1, s2 and s3, and the multi-mode terminal may measure signal strengths of the three frequency bands.

Here, one satellite cell or one satellite has one or more working frequency bands.

In an embodiment, each satellite may correspond to one satellite cell. Each satellite may be provided with a plurality of antennas, and the signal coverage range of each antenna corresponds to one sub-cell. Each satellite cell may include a plurality of sub-cells. Each antenna corresponds to one frequency band for communication with the multi-mode terminal.

Through the configuration of the measurement objects, the required measurement granularity can be flexibly controlled. On one hand, unnecessary measurement is reduced, on the other hand, the phenomenon that the measurement coverage range is not large enough is reduced, thereby precisely satisfying different measurement requirements.

In an embodiment, the multi-mode terminal may sequentially or simultaneously measure the measurement objects based on the measurement objects indicated by the configuration information. For example, the measurement objects indicated by the configuration information are the satellite A, the satellite B and the satellite C, in this case, the multi-mode terminal may sequentially or simultaneously measure the signal strengths of the satellite A, the satellite B and the satellite C.

In an embodiment, the measurement time may be a time at which the multi-mode terminal measures the satellite. The measurement time may be a start time point at which the multi-mode terminal starts measuring the satellite. For example, the satellite is measured at 14:30:30. The measurement time may also include a start time point and an end time point at which the multi-mode terminal starts and stops measuring the satellite. For example, the measurement for the satellite starts at 14:30:30, and stops at 15:30:30. The measurement time may also include a start time point and a measurement duration that the multi-mode terminal measures the satellite. For example, the measurement for the satellite starts at 14:30:30, and the duration of the measurement is 1 h.

In an embodiment, the measurement area may be an area in which the multi-mode terminal measures the satellite. Here, the area where the multi-mode terminal may appear may be divided in advance to acquire different sub-areas. For example, the area where the multi-mode terminal may appear is area B, and the area B may be divided into B1, B2 and B3. The area IDs corresponding to B1, B2 and B3 may be "001", "010" and "100". When the base station configures the multi-mode terminal to measure the satellite in the area B1, the configuration information may carry the ID of the area B1. In this way, the multi-mode terminal measures the satellite network when moving to the area B1, after receiving the configuration information.

In an embodiment, the measured signal parameter may be the received signal strength of the satellite.

In an embodiment, measuring the received signal strength of the satellite may be measuring a receiving power of the received signal. Here, the received signal strength of the satellite may be an average value of the receiving power of the received signals measured in unit time. In this way, the determined signal strength is more accurate.

In an embodiment, the information required to be recorded may be information that the base station indicates the multi-mode terminal to measure and store and that needs to be reported to the base station. The information required to be recorded may be information that needs to be recorded within a set time period, for example, information that needs to be recorded between 14:00 and 16:00.

In an embodiment, the measured duration in which the multi-mode terminal is covered by the satellite cell may be a duration in which the cell signal is measured. For example, the multi-mode terminal detects the signal of a cell X for 3 hours, in this case, the measured duration in which the multi-mode terminal is covered by the satellite network is 3 hours.

In an embodiment, the multi-mode terminal can measure the signal of the cell A when it moves within the range A, in this case, the measured coverage range of the satellite cell may be the range A.

In an embodiment, the multi-mode terminal may acquire the measurement result by measuring the satellite network based on the configuration information, and send the measurement result to the base station. The base station may adjust the signal coverage of the satellite based on the measurement result after receiving the measurement result. For example, the measurement result indicates that the signal strength is less than the set signal threshold in the area A, in this case, the base station may adjust the transmission power of the satellite corresponding to the area A, and increase the transmission power of the satellite in the area A. In this way, the signal strength of the signal received by the multi-mode terminal in the area A may be greater, and the wireless communication quality of the multi-mode terminal may be better.

In an embodiment, the multi-mode terminal may acquire the measurement result by measuring the satellite network based on the configuration information, and send the measurement result to the base station. The base station may adjust the signal coverage of the satellite based on the measurement result after receiving the measurement result. For example, the measurement result indicates that in a time period A, the signal strength of the area A is less than the set signal threshold or is zero, in this case, the base station may adjust the transmission power of the satellite corresponding to the area A in the time period A, and increase the transmission power of the satellite in the area A in the time period A. In this way, the signal strength of the signal received by the multi-mode terminal in the area A in the time period A may be greater, and the wireless communication quality of the multi-mode terminal may be better.

In the embodiments, the multi-mode terminal may acquire the measurement result associated with the satellite network by measuring the satellite network based on the configuration information after receiving the measurement configuration signaling. The measurement result may be used for the base station to adjust the signal coverage of the satellite network, so that the signal coverage of the satellite network is enhanced, and the multi-mode terminal has a better wireless communication quality.

Figure 5:
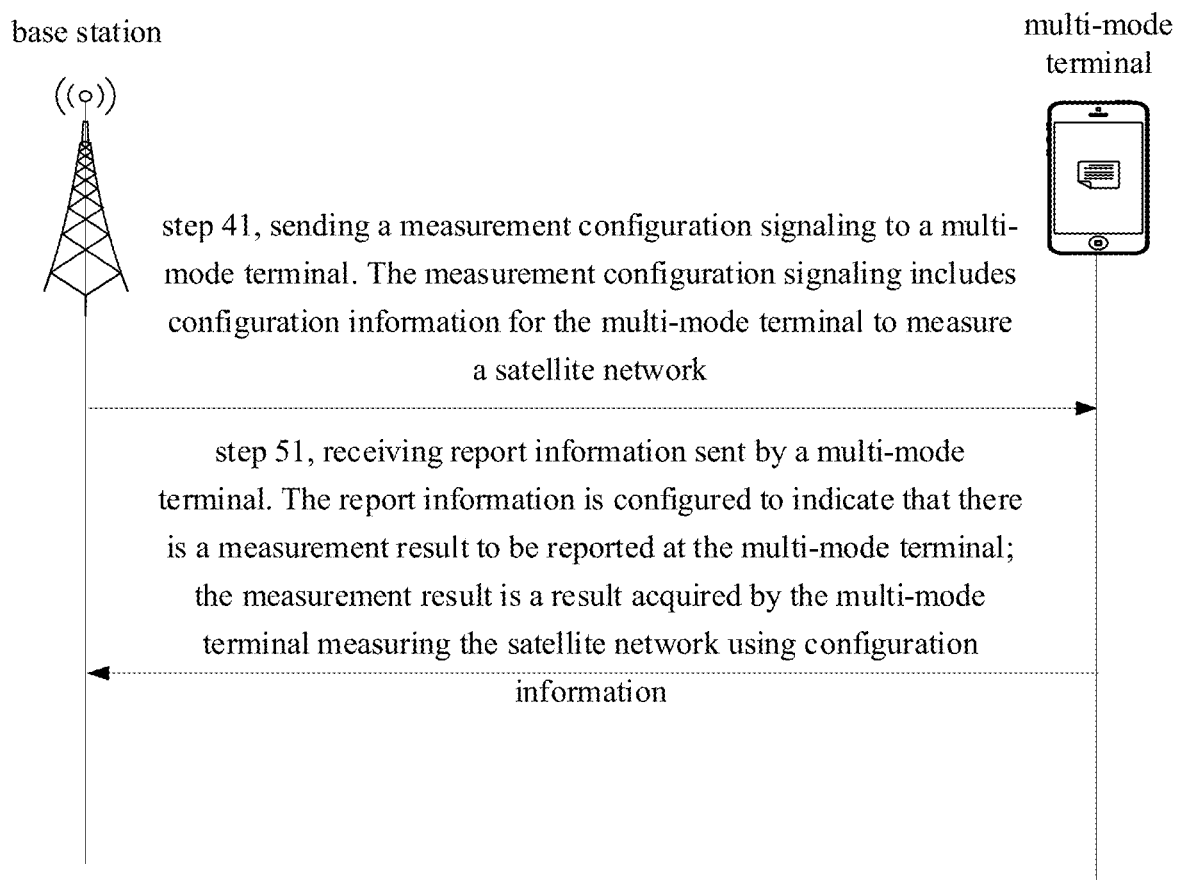
FIG. 5 is a flowchart illustrating a method for measuring a satellite network according to an embodiment.

As illustrated in FIG. 5, a method for measuring a satellite network is provided in the embodiment. The method further includes:

step 51, receiving report information sent by the multi-mode terminal.

The report information is configured to indicate that there is a measurement result to be reported at the multi-mode terminal; the measurement result is a result acquired by the multi-mode terminal measuring the satellite network using configuration information.

In an embodiment, report information sent by the multi-mode terminal periodically is received. Here, the multi-mode terminal periodically sends the report information to the base station, and the base station can acquire the latest measurement result in time, and can adjust the signal coverage of the satellite network based on the measurement result in time.

In an embodiment, the report information sent by the multi-mode terminal in response to acquiring the latest measurement result may be received. Since the multi-mode terminal may send the report information to the base station each time when acquiring the measurement result, the base station may acquire the latest measurement result in time, and can adjust the signal coverage of the satellite network based on the measurement result in time.

In an embodiment, the base station may send an acquisition request for the report information when having a need to adjust the coverage of the satellite network. The multi-mode terminal may send the report information after receiving the acquisition request sent by the base station.

In an embodiment, there being a measurement result to be reported at the multi-mode terminal may be that the multi-mode terminal storing the measurement result after acquiring the measurement result by measuring the satellite network.

Here, the measurement result may be a measured signal strength, a measured duration of a cell signal and a measured cell coverage, etc.

In an embodiment, the report information is further configured to indicate measurement information included in the measurement result. Here, the measurement information included in the measurement result may be information about the measured signal strength, information about the measured duration of the cell signal and information about the measured cell coverage, etc. Each of different measurement results may be provided with an information field. For example, when the measurement result includes information about the measured signal strength, the corresponding information field in the report information may be set to "1", and when the measurement information does not include information about the measured signal strength, the corresponding information field in the report information may be set to "0". In this way, after receiving the report information, the base station may determine which information is stored in the multi-mode terminal based on the indication of the information fields of the report information, so that the report information may be acquired in a targeted manner.

Figure 6:
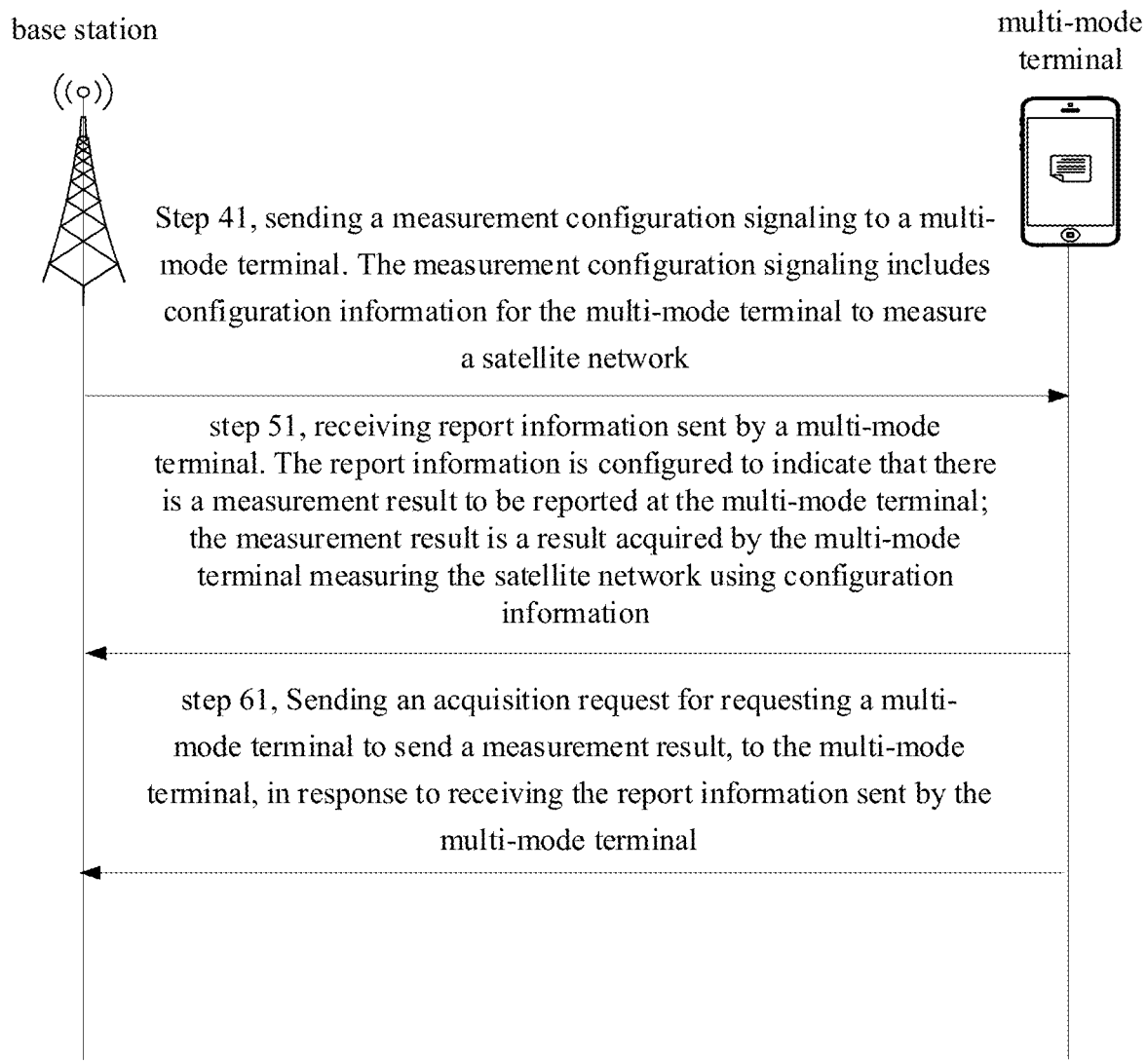
FIG. 6 is a flowchart illustrating a method for measuring a satellite network according to an embodiment.

As illustrated in FIG. 6, a method for measuring a satellite network is provided in the embodiment. The method further includes:

step 61, sending an acquisition request for requesting the multi-mode terminal to send the measurement result, to the multi-mode terminal, in response to receiving the report information sent by the multi-mode terminal.

The acquisition request includes at least one measurement information in the measurement result that needs to be acquired.

In an embodiment, when the base station needs to adjust the coverage range of the satellite network, the base station may send the acquisition request for requesting the multi-mode terminal to send the measurement result, to the multi-mode terminal. Adjusting the coverage range of the satellite network may be adjusting a transmission signal strength of a satellite, an angle of an antenna and/or a trajectory of the satellite, etc.

Here, the measurement result may be a measured signal strength, a measured duration of a cell signal and a measured cell coverage, etc.

In an embodiment, each of different measurement results may correspond to one information field. For example, when the measurement result includes information about the measured signal strength, the corresponding information field in the report information may be set to "1", and when the measurement information does not include information about the measured signal strength, the corresponding information field in the report information may be set to "0". After receiving the report information, the base station may determine which information is stored in the multi-mode terminal based on the indication of the report information fields, so that the report information may be acquired in a targeted manner. For example, the information fields indicates that the multi-mode terminal is stored with information about the signal strength, information about the measured duration of the cell signal and information about the measured cell coverage, in this case, the acquisition request sent by the base station to the multi-mode terminal may include the information about the signal strength, the measured duration of the cell signal and the measured cell coverage. Here, information fields may be set for different measurement information, and the base station may set different values for the information fields based on whether it needs to acquire the corresponding measurement information. For example, the information field corresponding to the signal strength in the acquisition request is set to "1", which represents that the base station requests to acquire the measurement result of the signal strength.

Figure 7:
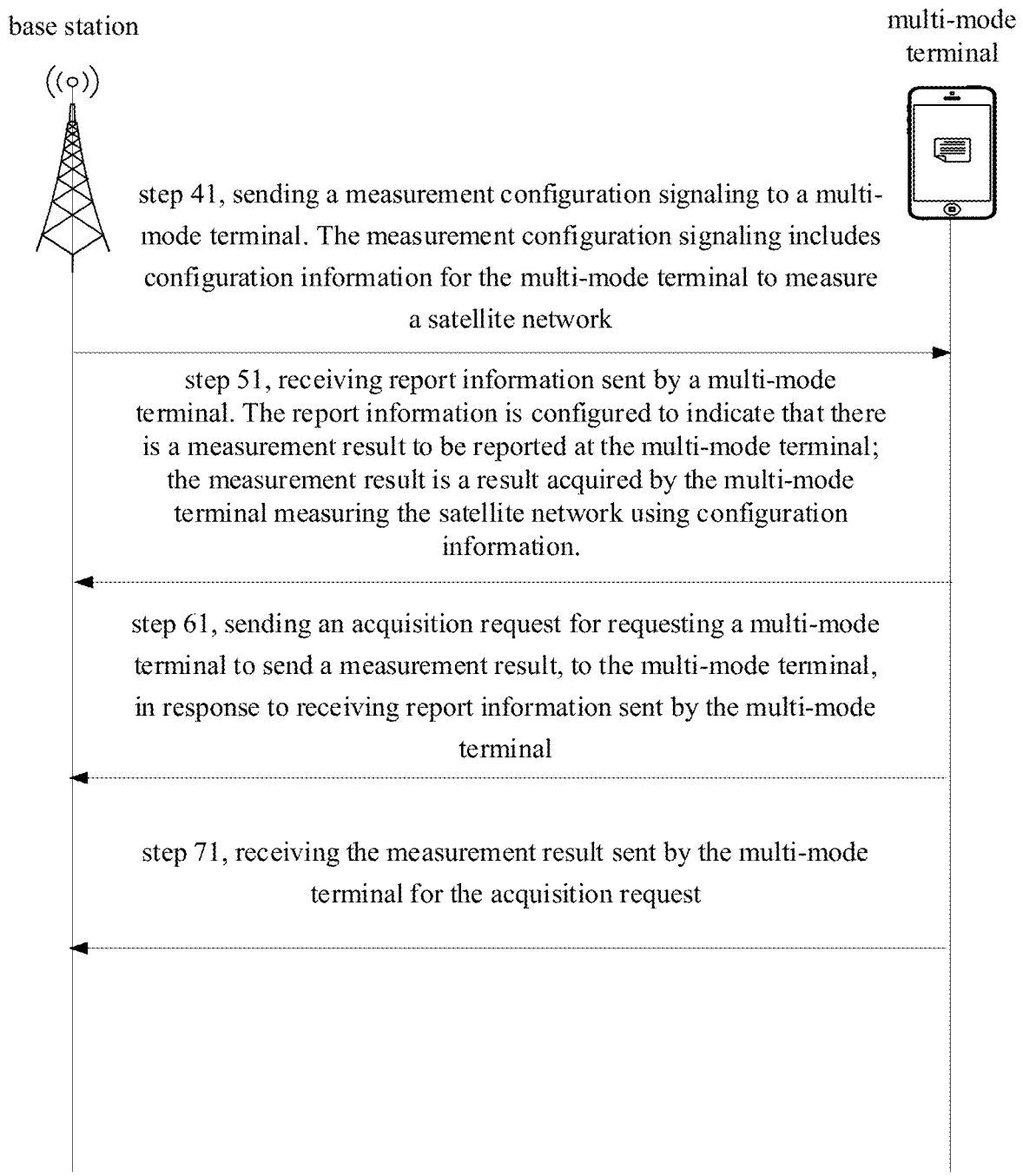
FIG. 7 is a flowchart illustrating a method for measuring a satellite network according to an embodiment.

As illustrated in FIG. 7, a method for measuring a satellite network is provided in the embodiments. The method further includes:

step 71, receiving the measurement result sent by the multi-mode terminal for the acquisition request.

Here, the measurement result may be the measured signal strength, the measured duration of the cell signal and the measured cell coverage, etc.

In an embodiment, the information field may be set for different measurement information, and the base station may set different values for the information field based on whether it needs to acquire the corresponding measurement information. For example, the information field corresponding to the signal strength in the acquisition request is set to "1", which represents that the base station requests to acquire the measurement result of the signal strength. The multi-mode terminal may determine which measurement information is sent to the base station based on values of the information fields in the acquisition request. For example, the information field corresponding to the signal strength in the acquisition request is set to "1", in this case, the measurement result sent by the multi-mode terminal to the base station may include information about the signal strength.

Figure 8:
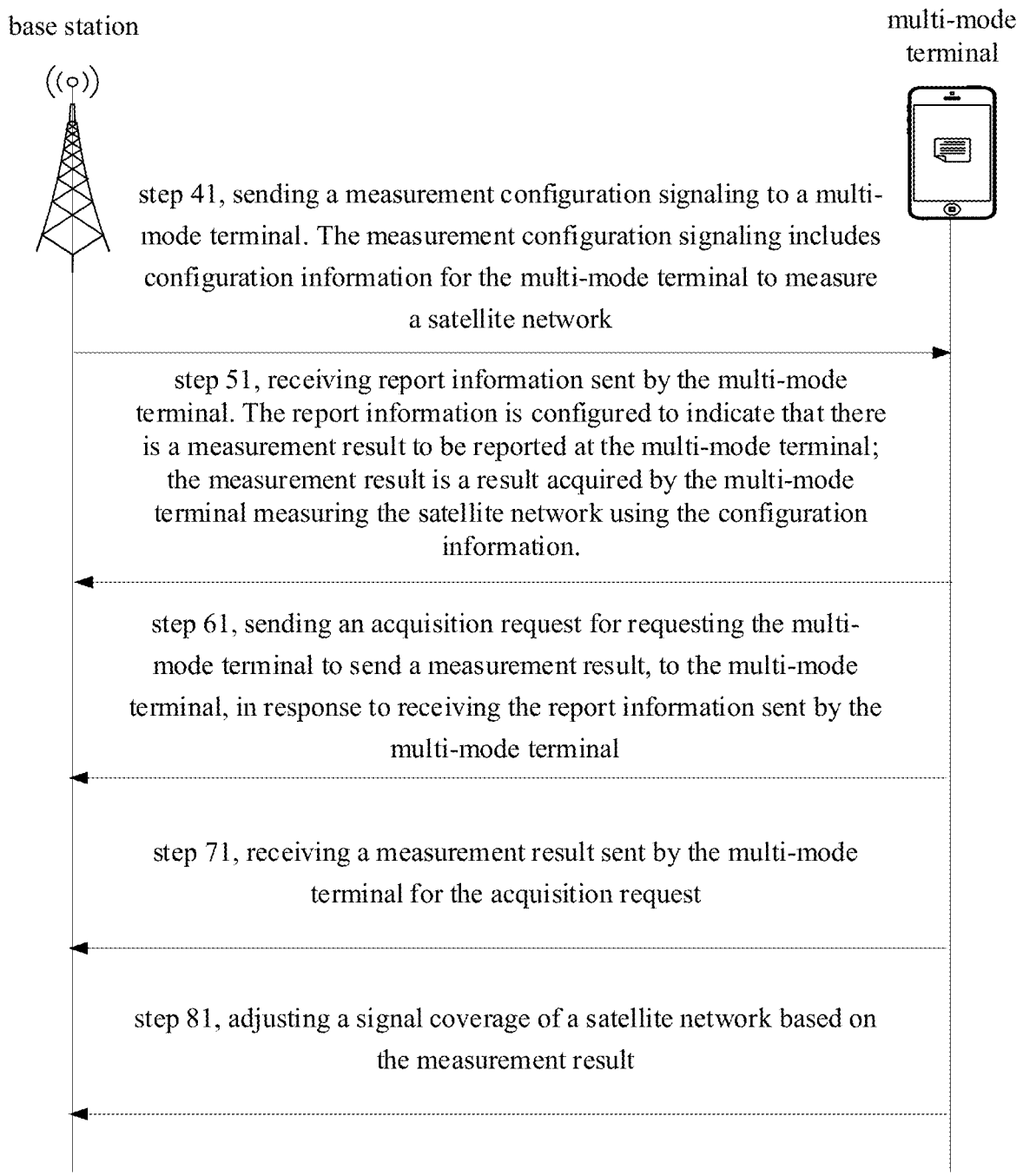
FIG. 8 is a flowchart illustrating a method for measuring a satellite network according to an embodiment.

As illustrated in FIG. 8, a method for measuring a satellite network is provided in the embodiments. The method further includes:

step 81, adjusting the signal coverage of the satellite network based on the measurement result.

In an embodiment, adjusting the coverage range of the satellite network may include adjusting the transmission signal strength of the satellite, the angle of the antenna and/or the trajectory of the satellite, etc.

In an embodiment, the base station determines that the signal coverage of the satellite network in the area A is poor based on the measurement result, in this case, the transmission power of the signal of the satellite corresponding to the area A may be increased.

In an embodiment, the base station determines that there is no signal coverage for the satellite network in the area A based on the measurement result, in this case, the angle of the antenna of the satellite corresponding to the area A may be adjusted, so that the signal transmission angle of the antenna is aligned with the area A, or the trajectory of the satellite in the area B is changed, and the satellite in the area B enters the A area, thereby achieving the satellite signal coverage of the area A. The area herein may be an airspace.

In an embodiment, the multi-mode terminal may acquire the measurement result by measuring the satellite network based on configuration information, and send the measurement result to the base station. The base station may adjust the signal coverage of the satellite based on the measurement result, after receiving the measurement result. For example, the measurement result indicates that the signal strength in the area A is less than the set signal threshold, in this case, the base station may adjust the transmission power of the satellite corresponding to the area A, and increase the transmission power of the satellite in the area A. In this way, the signal strength of the signal received by the multi-mode terminal in the area A may be greater, and the wireless communication quality of the multi-mode terminal may be better.

In an embodiment, the multi-mode terminal may acquire the measurement result by measuring the satellite network based on the configuration information, and send the measurement result to the base station. The base station may adjust the signal coverage of the satellite based on the measurement result, after receiving the measurement result. For example, the measurement result indicates that in a time period A, the signal strength of the area A is less than the set signal threshold or is zero, in this case, the base station may adjust the transmission power of the satellite corresponding to the area A in the time period A, and increase the transmission power of the satellite in the area A in the time period A. In this way, the signal strength of the signal received by the multi-mode terminal in the area A in the time period A may be greater, and the wireless communication quality of the multi-mode terminal may be better.

In an embodiment, increasing the transmission power of the satellite in the area A in the time period A may be increasing the transmission power of the satellite to greater than the set transmission power threshold.

Figure 9:
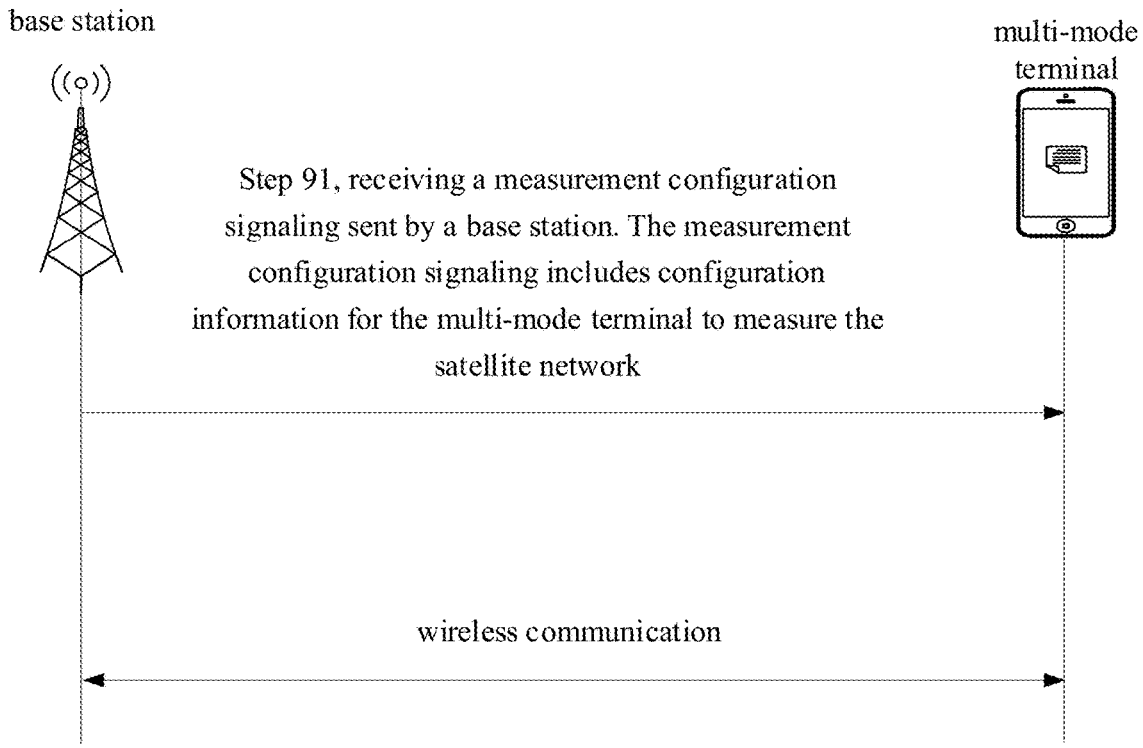
FIG. 9 is a flowchart illustrating a method for measuring a satellite network according to an embodiment.

As illustrated in FIG. 9, a method for measuring a satellite network is provided in the embodiment. The method is applied to a multi-mode terminal. The method includes:

step 91, receiving a measurement configuration signaling sent by a base station, in which the measurement configuration signaling includes configuration information for the multi-mode terminal to measure the satellite network.

The multi-mode terminal may be a terminal that not only supports wireless communication with a satellite but also supports wireless communication with a base station.

The multi-mode terminal may be but not limited to a mobile phone, a wearable device, a vehicle terminal, a road side unit (RSU), a smart home terminal, an industrial sensing device and/or a medical device.

The base station is an interface device for a multi-mode terminal to accesses a network. The base station may be various types of base stations, for example, a 3G base station, a 4G base station, a 5G base station or other evolutionary base station.

In an embodiment, the satellite network may be deployed in an airspace where a density of ground base stations is less than a density threshold and a strength of a wireless communication signal is less than a strength threshold, for example, the airspace where a remote mountainous area or an ocean is located.

In an embodiment, when the signal strength of the signal received by the multi-mode terminal from the bases station is greater than a signal threshold, the multi-mode terminal establishes the wireless communication connection with the base station; and when the signal strength of the signal received by the multi-mode terminal from the base station and a neighboring base station is less than the signal threshold, the multi-mode terminal establishes the wireless communication connection with the satellite. In a good channel environment, a threshold condition for establishing the connection with the base station may be satisfied first, and the multi-mode terminal may preferentially select to establish the wireless communication connection with the base station. In this way, an unnecessary wireless communication connection between the multi-mode terminal and the satellite and satellite network resources occupied are reduced when there is a base station available for the multi-mode terminal to establish a connection. The multi-mode terminal may establish the wireless communication connection with the satellite network when there is no suitable base station for the multi-mode terminal to establish a connection, thereby ensuring the wireless communication quality of the multi-mode terminal.

In an embodiment, the base station may send the measurement configuration signaling to the multi-mode terminal in a unicast mode.

In another embodiment, the base station may send the measurement configuration signaling to the multi-mode terminal in a broadcast mode.

In an embodiment, the measurement configuration signaling may be an existing radio resource control (RRC) signaling carrying configuration information. In this way, the configuration information is carried in the existing radio resource control (RRC) signaling, which achieves multiplexing of the radio resource control (RRC) signaling, and improves compatibility of the signaling.

In an embodiment, the base station may periodically send the measurement configuration signaling to the multi-mode terminal. The multi-mode terminal may acquire updated configuration information in time when the configuration information is updated constantly. For example, the base station periodically sends the measurement configuration signaling to the terminal, then in a certain period, if the configuration information of the base station is updated, the base station may send the updated configuration information to the multi-mode terminal in the certain period. In this way, the multi-mode terminal can acquire the updated configuration information in time in the certain period.

In an embodiment, the base station may receive a measurement result acquired by the multi-mode terminal measuring using the configuration information. The base station may adjust a signal coverage of the satellite network based on the measurement result. The base station adjusts the signal coverage of the satellite network may be that the base station sends a control instruction for controlling adjustment of the signal coverage of the satellite network to the satellite network. The base station adjusts the signal coverage of the satellite network also may be that the base station sends a control instruction for controlling adjustment of the coverage of the satellite network to a satellite control center. The satellite control center may forward the control instruction to the satellite network after receiving the control instruction sent by the base station. The control instruction may be configured to control the satellite to increase a power of a satellite transmission signal, change a trajectory of a satellite, adjust a signal transmission direction of a satellite antenna, etc. In an embodiment, increasing the power of the satellite transmission signal may be increasing the transmission power of the satellite to greater than a set transmission power.

In an embodiment, the base station sends the measurement configuration signaling to the multi-mode terminal, and the multi-mode terminal acquires the measurement result by measuring the satellite network using the configuration information included in the measurement configuration signaling. The base station may adjust the signal strength of the satellite based on the measurement result. For example, the multi-mode terminal may measure a satellite in a preset area indicated by the configuration information after receiving the measurement configuration signaling. The multi-mode terminal may send the measurement result to the base station in response to detecting that the signal strength of the satellite in the preset area is less than a set strength threshold, and the base station may increase the signal transmission power of the satellite in response to determining that the satellite signal strength is less than the set strength threshold based on the measurement result. In this way, the wireless signal strength received by the multi-mode terminal may be greater, which may ensure the wireless communication quality of the multi-mode terminal. In an embodiment, the base station may adjust the direction of the satellite transmission signal based on the measurement result. For example, the multi-mode terminal may measure the satellite in the preset area indicated by the configuration information after receiving the measurement configuration signaling. The multi-mode terminal may send the measurement result to the base station in response to detecting that the signal strength of the satellite in the preset area is less than the set strength threshold, and the base station may adjust the signal transmission angle of the antenna in response to determining that the satellite signal strength is less than the set strength threshold based on the measurement result, so that the direction of the transmission signal of the antenna is aligned with the multi-mode terminal. In this way, the wireless signal strength received by the multi-mode terminal may be greater, which may ensure the wireless communication quality of the multi-mode terminal.

In an embodiment, the satellite network may be a communication network at least including a plurality of communication satellites in the airspace. The multi-mode terminal may access the satellite network via the communication satellite for mobile wireless communication. Communication functions of the communication satellite include at least one of: receiving a signal, changing a frequency of a signal, amplifying a signal, forwarding a signal and positioning.

In an embodiment, the measurement configuration signaling is sent to the multi-mode terminal in response to establishing the RRC connection with the satellite when the multi-mode terminal is powered on. In this way, after the multi-mode terminal measures the signal of the satellite network using the configuration information included in the measurement configuration signaling, the multi-mode terminal may select a satellite with the signal strength of the wireless communication greater than a set threshold for access based on the signal measurement result. For example, the multi-mode terminal measures the satellite network using a preset space indicated by the configuration information, and measures three satellites in the preset space, which are respectively a satellite 1, a satellite 2 and a satellite 3. The multi-mode terminal measures that the signal strength of the satellite 1 is greater than the signal strength of the satellite 2 and the signal strength of the satellite 3, in this case, the multi-mode terminal may select to establish the wireless communication connection with the satellite 1, so that the wireless communication quality of the satellite may be ensured.

In an embodiment, the base station may send the measurement configuration signaling to the multi-mode terminal after the multi-mode terminal accesses the satellite network. The multi-mode terminal may switch to a satellite with a good wireless communication quality according to the measurement result, after measuring the satellite network using the configuration information included in the measurement configuration signaling. For example, the multi-mode terminal has established a wireless communication connection with the satellite 1, and the base station may send the measurement configuration signaling to the multi-mode terminal. The multi-mode terminal may measure the satellite in the preset area indicated by the configuration information after receiving the measurement configuration signaling. The multi-mode terminal may select to switch to establish a wireless communication connection with the satellite 2 in response to detecting that the signal strength of the satellite 2 is greater than the signal strength of the satellite 1 in the preset area. In this way, the wireless communication quality of the satellite may be ensured.

In an embodiment, the multi-mode terminal acquires the measurement result by measuring the satellite network using the configuration information included in the measurement configuration signaling. The base station may adjust the signal strength of the satellite based on the measurement result. For example, the multi-mode terminal may measure the satellite in the preset area indicated by the configuration information after receiving the measurement configuration signaling. The multi-mode terminal may send the measurement result to the base station in response to detecting that the signal strength of the satellite in the preset area is less than a set strength threshold, and the base station may increase the signal transmission power of the satellite in response to determining that the satellite signal strength is less than the set strength threshold based on the measurement result. In this way, the wireless signal strength received by the multi-mode terminal may be greater, which may ensure the wireless communication quality of the multi-mode terminal.

In an embodiment, the base station sends the measurement configuration signaling to the multi-mode terminal in response to that the multi-mode terminal establishes the RRC connection with the base station. In this way, the multi-mode terminal may measure the satellite network based on the configuration information, and select a satellite with the signal strength greater than the strength threshold for access based on the measurement result.

In an embodiment, when the multi-mode terminal establishes the radio resource control (RRC) connection with the base station, the multi-mode terminal sends an acquisition request for configuration information to the base station, and the base station sends the configuration information associated with the acquisition request to the multi-mode terminal after receiving the acquisition request. The multi-mode terminal may periodically send the acquisition request to the base station until the configuration information associated with the acquisition request fed back by the base station is received. In this way, the situation that the base station cannot receive the acquisition request due to the poor wireless communication environment with the base station is reduced, and the reliability of transmission of the acquisition request is improved.

In an embodiment, the base station sends the configuration information associated with the acquisition request to the multi-mode terminal, in response to receiving the acquisition request for the configuration information sent by the multi-mode terminal after receiving a trigger instruction from a user. For example, when the multi-mode terminal works in a remote mountainous area, the density of base stations is small, and the signal coverage is poor, which results in that the strength is less than the signal threshold, and the multi-mode terminal often fails to connect a network, and needs to access the satellite network. In this case, the multi-mode terminal may be triggered to send the acquisition request for the configuration information to the base station. The satellite may send the configuration information associated with the acquisition request to the multi-mode terminal after receiving the acquisition request. In this way, the terminal can acquire the measurement result by measuring the satellite network using the configuration information, and send the measurement result to the base station. The base station adjusts the power of the satellite transmission signal based on the measurement result. For example, the strength of the satellite transmission signal is adjusted to be greater than the strength threshold. As such, the strength of the satellite transmission signal increases, the signal strength received by the multi-mode terminal may increase, and the multi-mode terminal may select a satellite with a large signal strength for access, to ensure the wireless communication quality of the multi-mode terminal.

In an embodiment, the base station may send configuration information associated with the acquisition request to the multi-mode terminal, in response to the acquisition request for the configuration information, which is sent by the multi-mode terminal to the base station after detecting that the strength of the wireless communication signal sent by the satellite is less than the signal strength. For example, when the multi-mode terminal works in a remote mountainous area, the density of the base station is small, and the signal coverage is poor, which results in that the signal strength is less than the signal threshold, the multi-mode terminal selects to perform wireless communication via the satellite network. The multi-mode terminal may be triggered to send the acquisition request for configuration information to the base station when the strength of the wireless communication signal detected by the multi-mode terminal is less than the signal threshold. The base station may send the configuration information associated with the acquisition request to the multi-mode terminal after receiving the acquisition request. In this way, the multi-mode terminal may acquire the measurement result by measuring the satellite network using the configuration information, and send the measurement result to the base station. The base station may adjust the signal coverage of the satellite based on the measurement result after receiving the measurement result. Here, adjusting the signal coverage of the satellite may be increasing the power of the satellite transmission signal, changing the trajectory of the satellite and adjusting the signal transmission direction of the satellite antenna, etc.

In an embodiment, the base station sends the configuration information associated with the acquisition request to the multi-mode terminal, in response to receiving the acquisition request for the configuration information sent by the multi-mode terminal to the base station after the multi-mode terminal is powered on. The base station sends the configuration information associated with the acquisition request to the multi-mode terminal after receiving the acquisition request sent by the multi-mode terminal.

In an embodiment, the base station sends the measurement configuration signaling to the multi-mode terminal when the number of loads connected by the base station exceeds a number threshold, in order to relieve the load of the base station. The multi-mode terminal acquires the measurement result by measuring the satellite network based on the configuration information and send the measurement result to the base station, after receiving the measurement configuration signaling sent by the base station. The base station adjusts the coverage of the satellite network based on the measurement result. Here, adjusting the coverage of the satellite network may be increasing the power of the satellite transmission signal, changing the trajectory of the satellite, adjusting the signal transmission direction of the satellite antenna, etc. In this way, the multi-mode terminal may establish a wireless communication with the satellite with a good signal strength, which relieves the burden that the number of loads connected to the base station exceeds the number threshold.

The configuration information includes indicating at least one of:
- a measurement object, the measurement object including a satellite, a satellite cell and/or a satellite frequency band;
- measurement time;
- a measurement area;
- a signal parameter required to be measured; and
- information required to be recorded, the information required to be recorded including: a measured duration in which the multi-mode terminal is covered by a satellite cell and/or a measured coverage range of a satellite cell.

In an embodiment, the measurement object may include one or more satellites. For example, in an embodiment, the configuration information carries identity documents (IDs) of satellites, and the multi-mode terminal may measure the satellite indicated by the ID of the satellite after receiving the configuration information. The ID of the satellite is configured to uniquely identify one satellite. For example, the configuration information includes IDs of three measurement objects: ID "001" of satellite A, ID "010" of satellite B, and ID "100" of satellite C, respectively. In an embodiment, a plurality of satellites may be adjacent to each other. In another embodiment, the plurality of satellites may also be a plurality of satellites in a preset airspace, for example, satellites running in airspace A.

In an embodiment, the measurement object may include one or more satellite cells. For example, in an embodiment, the configuration information carries IDs of satellite cells, and the multi-mode terminal may measure the satellite cells indicated by the IDs of the satellite cells after receiving the configuration information. The ID of the satellite cell is configured to uniquely identify one satellite cell. For example, the configuration information includes IDs of three measurement objects: ID "101" of satellite cell C, ID "110" of satellite cell D, and ID "111" of satellite cell E, respectively. Here, a plurality of satellite cells may be a plurality of satellites that are adjacent to each other. In another embodiment, the plurality of satellite cells may be a plurality of satellite cells in a preset area range, for example, satellite cells in a range B.

In an embodiment, the measurement object may include frequency bands of one or more satellites. The frequency band of the satellite is a frequency band for wireless communication between the multi-mode terminal and the satellite. For example, the frequency band for communication between the multi-mode terminal and the satellite A is X1, the frequency band for communication between the multi-mode terminal and the satellite B is X2, and the frequency band for communication between the multi-mode terminal and the satellite C is X3. The configuration information may include three frequency bands X1, X2 and X3, and the multi-mode terminal may measure the signals corresponding to the three frequency bands.

In an embodiment, the measurement object may also include frequency bands of a plurality of antennas included in one satellite. Here, the frequency band of the antenna is a frequency band for communication between the multi-mode terminal and the antenna of the satellite. For example, the communication frequency band for wireless communication between the multi-mode terminal and antenna a of the satellite is s1, the communication frequency band for wireless communication between the multi-mode terminal and antenna b of the satellite is s2, and the communication frequency band for wireless communication between the multi-mode terminal and antenna c of the satellite is s3. The configuration information may include three frequency bands s1, s2 and s3, and the multi-mode terminal may measure signal strengths of the three frequency bands.

Here, one satellite cell or one satellite has one or more working frequency bands.

Through the configuration of the measurement objects, the required measurement granularity can be flexibly controlled. On one hand, unnecessary measurement is reduced, on the other hand, the phenomenon that the measurement coverage range is not large enough is reduced, thereby precisely satisfying different measurement requirements.

In an embodiment, each satellite may correspond to one satellite cell. Each satellite may be provided with a plurality of antennas, and the signal coverage range of each antenna corresponds to one sub-cell. Each satellite cell may include a plurality of sub-cells. Each antenna corresponds to one frequency band for communication with the multi-mode terminal.

In an embodiment, the multi-mode terminal may sequentially or simultaneously measure the measurement objects based on the measurement objects indicated by the configuration information. For example, the measurement objects indicated by the configuration information are the satellite A, the satellite B and the satellite C, in this case, the multi-mode terminal may sequentially or simultaneously measure the signal strengths of the satellite A, the satellite B and the satellite C.

In an embodiment, the measurement time may be a time at which the multi-mode terminal measures the satellite. The measurement time may be a start time point at which the multi-mode terminal starts measuring the satellite. For example, the satellite is measured at 14:30:30. The measurement time may also include a start time point and an end time point at which the multi-mode terminal starts and stops measuring the satellite. For example, the measurement for the satellite starts at 14:30:30, and stops at 15:30:30. The measurement time may also include a start time point and a measurement duration that the multi-mode terminal measures the satellite. For example, the measurement for the satellite starts at 14:30:30, and the duration of the measurement is 1 h.

In an embodiment, the measurement area may be an area in which the multi-mode terminal measures the satellite. Here, the area where the multi-mode terminal may appear may be divided in advance to acquire different sub-areas. For example, the area where the multi-mode terminal may appear is area B, and the area B may be divided into B1, B2 and B3. The area IDs corresponding to B1, B2 and B3 may be "001", "010" and "100". When the base station configures the multi-mode terminal to measure the satellite in the area B1, the configuration information may carry the ID of the area B1. In this way, the multi-mode terminal measures the satellite network when moving to the area B1, after receiving the configuration information.

In an embodiment, the measured signal parameter may be the received signal strength of the satellite.

In an embodiment, measuring the received signal strength of the satellite may be measuring a receiving power of the received signal. Here, the received signal strength of the satellite may be an average value of the receiving power of the received signals measured in unit time. In this way, the determined signal strength is more accurate.

In an embodiment, the information required to be recorded may be information that the base station indicates the multi-mode terminal to measure and store and that needs to be reported to the base station. The information required to be recorded may be information that needs to be recorded within a set time period, for example, information that needs to be recorded between 14:00 and 16:00.

In an embodiment, the measured duration in which the multi-mode terminal is covered by the satellite cell may be a duration in which the cell signal is measured. For example, the multi-mode terminal detects the signal of a cell X for 3 hours, in this case, the measured duration in which the multi-mode terminal is covered by the satellite network is 3 hours.

In an embodiment, the multi-mode terminal can measure the signal of the cell A when it moves within the range A, in this case, the measured coverage range of the satellite cell may be the range A.

In an embodiment, the multi-mode terminal may acquire the measurement result by measuring the satellite network based on the configuration information, and send the measurement result to the base station. The base station may adjust the signal coverage of the satellite based on the measurement result after receiving the measurement result. For example, the measurement result indicates that the signal strength is less than the set signal threshold in the area A, in this case, the base station may adjust the transmission power of the satellite corresponding to the area A, and increase the transmission power of the satellite in the area A. In this way, the signal strength of the signal received by the multi-mode terminal in the area A may be greater, and the wireless communication quality of the multi-mode terminal may be better.

In an embodiment, the multi-mode terminal may acquire the measurement result by measuring the satellite network based on the configuration information, and send the measurement result to the base station. The base station may adjust the signal coverage of the satellite based on the measurement result after receiving the measurement result. For example, the measurement result indicates that in a time period A, the signal strength of the area A is less than the set signal threshold or is zero, in this case, the base station may adjust the transmission power of the satellite corresponding to the area A in the time period A, and increase the transmission power of the satellite in the area A in the time period A. In this way, the signal strength of the signal received by the multi-mode terminal in the area A in the time period A may be greater, and the wireless communication quality of the multi-mode terminal may be better.

In an embodiment, increasing the transmission power of the satellite in the area A in the time period A may be increasing the transmission power of the satellite to greater than the set signal threshold.

In the embodiments, the multi-mode terminal may acquire the measurement result associated with the satellite network by measuring the satellite network based on the configuration information after receiving the measurement configuration signaling. The measurement result may be used for the base station to adjust the signal coverage of the satellite network, so that the signal coverage of the satellite network is enhanced, and the multi-mode terminal has a better wireless communication quality.

Figure 10:
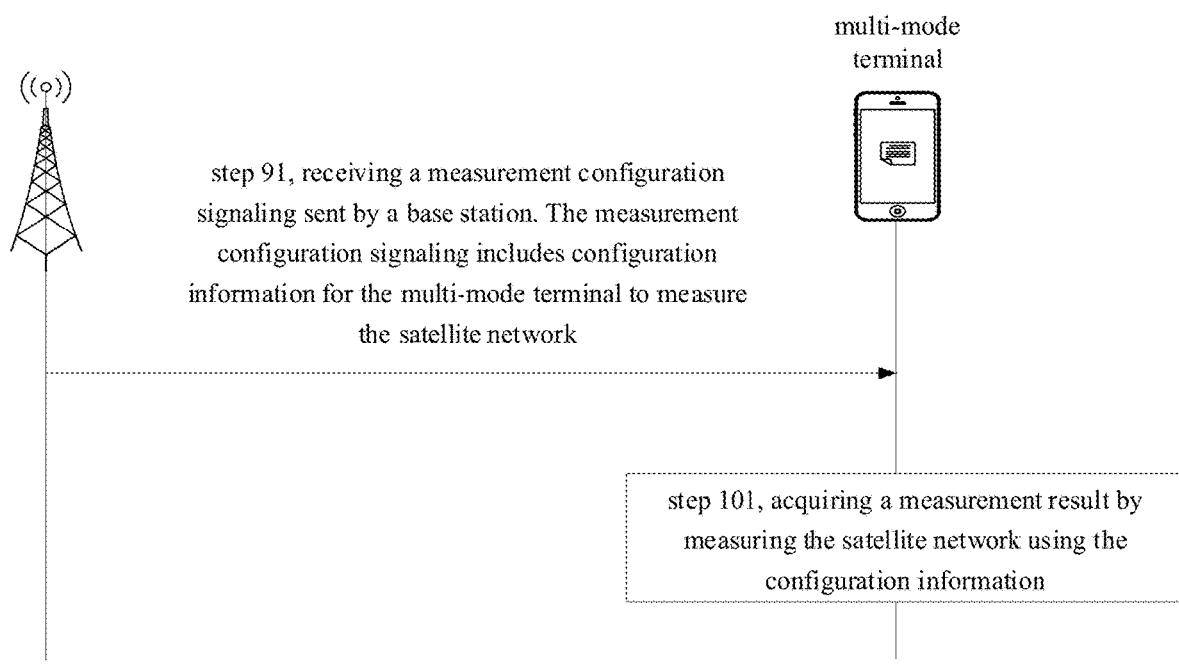
FIG. 10 is a flowchart illustrating a method for measuring a satellite network according to an embodiment.

As illustrated in FIG. 10, a method for measuring a satellite network is provided in the embodiment. The method further includes:

step 101, acquiring a measurement result by measuring the satellite network using the configuration information.

In an embodiment, in the configuration information, the measurement time is 12:00, the measurement area is an area A, the measured signal parameter is a signal strength, and the information required to be recorded is a duration in which the multi-mode terminal is covered by the area A. The multi-mode terminal may measure for the signal strength in the area A at 12:00, and record the duration that the area A covers the multi-mode terminal, to acquire the measurement result.

Figure 11:
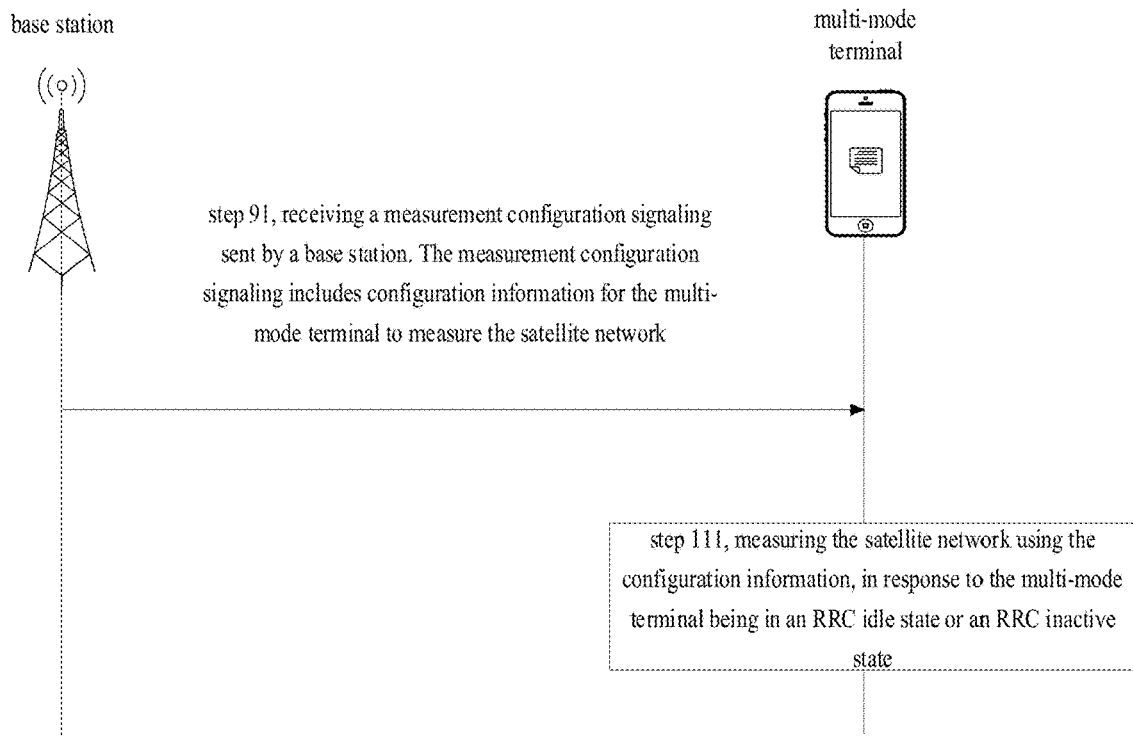
FIG. 11 is a diagram illustrating a method for measuring a satellite network according to an embodiment.

As illustrated in FIG. 11, a method for measuring a satellite network is provided in the embodiment. Measuring the satellite network using configuration information includes:

step 111, measuring the satellite network using the configuration information in response to the multi-mode terminal being in a radio resource control (RRC) idle state or an RRC inactive state.

In an embodiment, the satellite network is measured using the configuration information when the multi-mode terminal enters the RRC idle state or the RRC inactive state.

In an embodiment, the measurement result is stored based on a storage parameter included in the configuration information. The storage parameter may indicate a kind of measurement information that needs to be stored. The kind of measurement information may be a measured signal strength, a measured duration of a cell signal and a measured cell coverage, etc. When the configuration information includes the storage parameter corresponding to the kind of measurement information, the kind of measurement information is stored.

Figure 12:
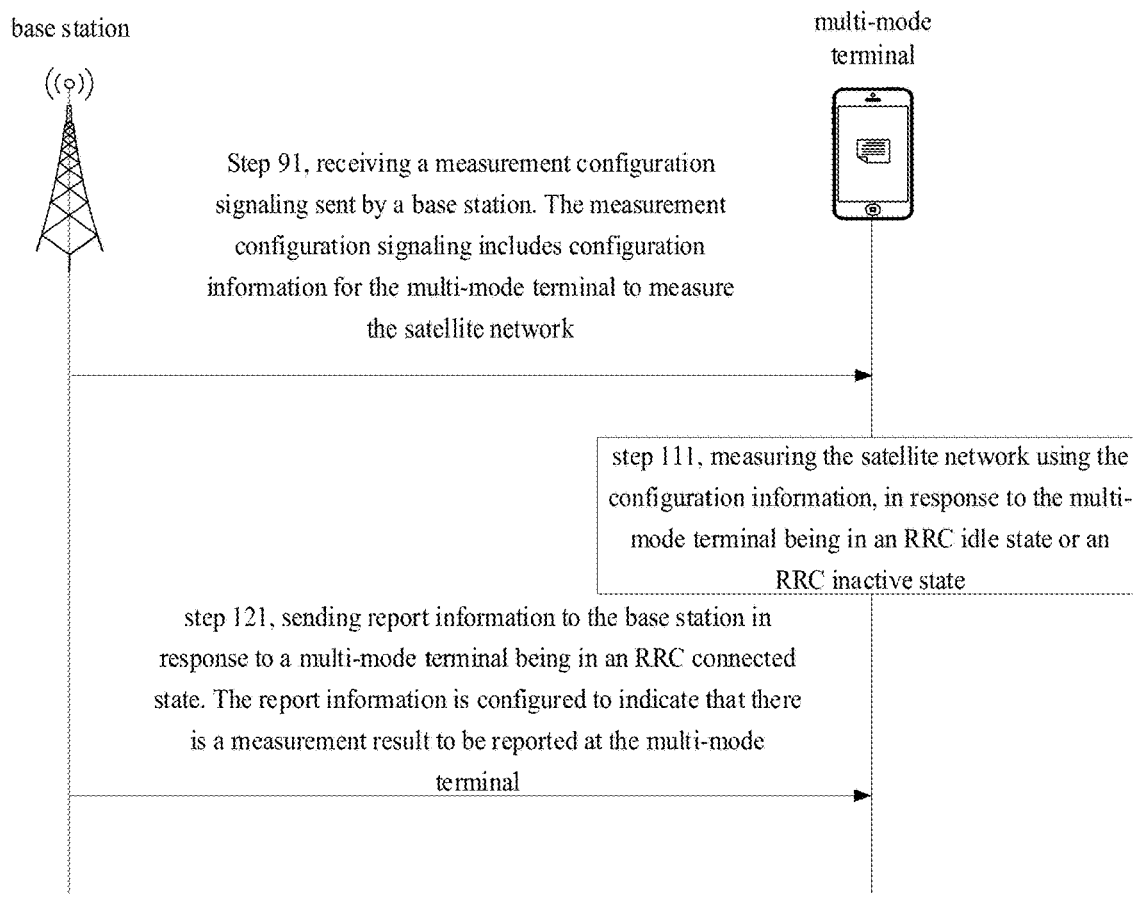
FIG. 12 is a diagram illustrating a method for measuring a satellite network according to an embodiment.

As illustrated in FIG. 12, a method for measuring a satellite network is provided in the embodiment. The method further includes:

step 121, sending report information to the base station in response to the multi-mode terminal being in an RRC connected state. The report information is configured to indicate that there is a measurement result to be reported at the multi-mode terminal.

In an embodiment, the report information may be periodically sent. The multi-mode terminal periodically sends the report information to the base station, and the base station can acquire the latest measurement result in time, and adjust the signal coverage of the satellite network based on the measurement result in time.

In an embodiment, it may be sending the report information in response to acquiring the latest measurement result. Since the multi-mode terminal may send the report information to the base station when acquiring the measurement result each time, the base station may acquire the latest measurement result in time, and adjust the signal coverage of the satellite network based on the measurement result in time.

In an embodiment, the base station may send an acquisition request for the report information when it has a need to adjust the coverage of the satellite network. The multi-mode terminal sends the report information after receiving the acquisition request sent by the base station.

In an embodiment, there being a measurement result to be reported at the multi-mode terminal may be that the multi-mode terminal stores the measurement result after acquiring the measurement result by measuring the satellite network. Here, the measurement result may be a measured signal strength, a measured duration of a cell signal and a measured cell coverage, etc.

In an embodiment, the report information is further configured to indicate the measurement information included in the measurement result. The measurement information included in the measurement result may be information about the measured signal strength, information about the measured duration of the cell signal and information about the measured cell coverage, etc. Each of different measurement results may be provided with an information field. For example, when the measurement result includes information about the measured signal strength, the corresponding information field in the report information may be set to "1", and when the measurement information does not include information about the measured signal strength, the corresponding information field in the report information may be set to "0". After receiving the report information, the base station may determine which information is stored in the multi-mode terminal based on the indication of the report information fields, so that the report information may be acquired in a targeted manner.

Figure 13:
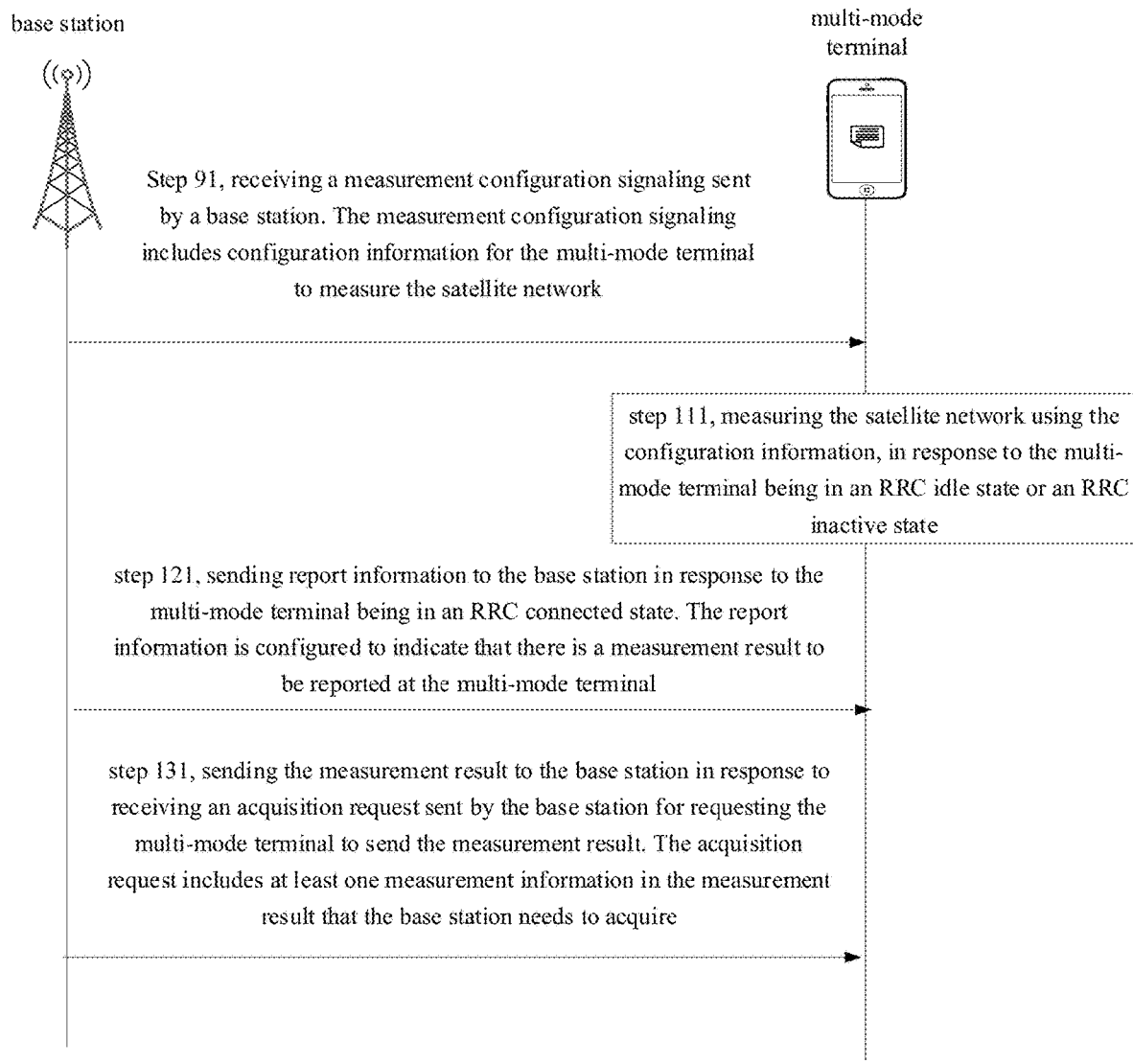
FIG. 13 is a diagram illustrating a method for measuring a satellite network according to an embodiment.

As illustrated in FIG. 13, a method for measuring a satellite network is provided in the embodiment. The method further includes:

step 131, sending the measurement result to the base station in response to receiving the acquisition request sent by the base station for requesting the multi-mode terminal to send the measurement result.

The acquisition request includes at least one measurement information in the measurement result that the base station needs to acquire.

In an embodiment, the base station may send the acquisition request for requesting the multi-mode terminal to send the measurement result, when the base station needs to adjust the coverage range of the satellite network. Adjusting the coverage range of the satellite network may be adjusting a transmission signal strength of the satellite, an angle of an antenna and/or a trajectory of the satellite, etc.

Here, the measurement result may be a measured signal strength, a measured duration of a cell signal and a measured cell coverage, etc.

In an embodiment, each of different measurement results may correspond to one information field. For example, when the measurement result includes information about the measured signal strength, the corresponding information field in the report information may be set to "1", and when the measurement information does not include information about the measured signal strength, the corresponding information field in the report information may be set to "0". After receiving the report information, the base station may determine which information is stored in the multi-mode terminal based on the indication of the report information fields, so that the report information may be acquired in a targeted manner. For example, the information fields indicates that the multi-mode terminal is stored with information about the signal strength, information about the measured duration of the cell signal and information about the measured cell coverage, in this case, the acquisition request sent by the base station to the multi-mode terminal may include the information about the signal strength, the measured duration of the cell signal and the measured cell coverage. Here, information fields may be set for different measurement information, and the base station may set different values for the information fields based on whether it needs to acquire the corresponding measurement information. For example, the information field corresponding to the signal strength in the acquisition request is set to "1", which represents that the base station requests to acquire the measurement result of the signal strength.

Figure 14:
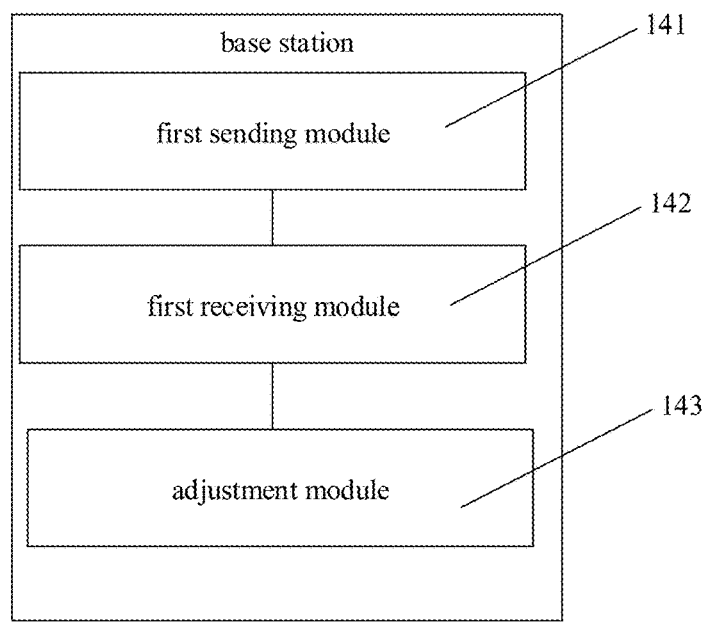
FIG. 14 is a diagram illustrating a base station according to an embodiment.

As illustrated in FIG. 14, a base station is provided in the embodiment. The base station includes a first sending module 141.

The first sending module 141 is configured to send a measurement configuration signaling to a multi-mode terminal. The measurement configuration signaling includes configuration information for the multi-mode terminal to measure a satellite network.

In an embodiment, the base station further includes a first receiving module 142. The first receiving module 142 is configured to receive report information sent by the multi-mode terminal;

the report information is configured to indicate that there is a measurement result to be reported at the multi-mode terminal; the measurement result is a result acquired by the multi-mode terminal measuring the satellite network using the configuration information.

In an embodiment, the first sending module 141 is further configured such that the report information is further configured to indicate measurement information included in the measurement result.

In an embodiment, the first receiving module 142 is further configured to send an acquisition request for requesting the multi-mode terminal to send the measurement result, in response to receiving the report information sent by the multi-mode terminal;

the acquisition request includes at least one measurement information in the measurement result that needs to be acquired.

In an embodiment, the first receiving module 142 is further configured to receive the measurement result sent by the multi-mode terminal for the acquisition request.

In an embodiment, the base station further includes an adjustment module 143. The adjustment module 143 is configured to: adjust a signal coverage of the satellite network based on the measurement result.

In an embodiment, the first sending module 141 is further configured such that the configuration information includes indicating at least one of:

a measurement object, the measurement object including a satellite, a satellite cell and/or a satellite frequency band;

measurement time;

a measurement area;

a signal parameter required to be measured; and information required to be recorded, the information required to be recorded including: a measured duration in which the multi-mode terminal is covered by the satellite cell and/or a measured coverage range of the satellite cell.

Figure 15:
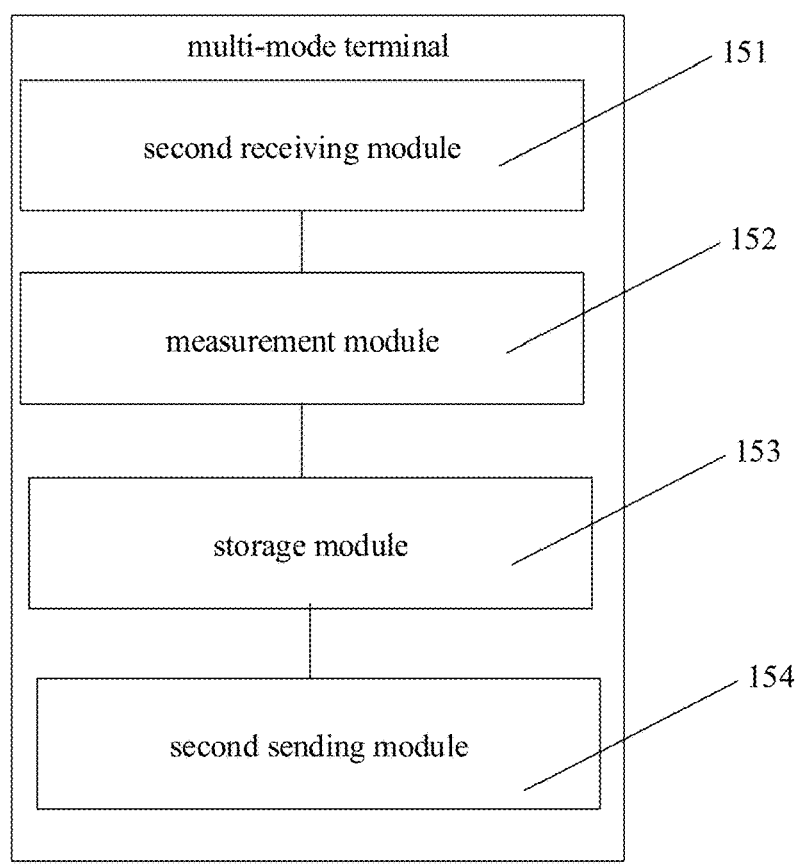
FIG. 15 is a diagram illustrating a multi-mode terminal according to an embodiment.

As illustrated in FIG. 15, a multi-mode terminal is provided in the embodiment, and the multi-mode terminal includes a second receiving module 151.

The second receiving module 151 is configured to receive a measurement configuration signaling sent by a base station; the measurement configuration signaling includes configuration information for the multi-mode terminal to measure the satellite network.

In an embodiment, the multi-mode terminal further includes a measurement module 152. The measurement module 152 is configured to acquire a measurement result by measuring the satellite network using the configuration information.

In an embodiment, the measurement module 152 is further configured to:

measure the satellite network using the configuration information in response to the multi-mode terminal being in an RRC idle state or an RRC inactive state.

In an embodiment, the multi-mode terminal further includes a storage module 153. The storage module 153 is further configured to:

store the measurement result based on a storage parameter included in the configuration information.

In an embodiment, the multi-mode terminal further includes a second sending module 154. The second sending module 154 is further configured to:

send report information to the base station in response to the multi-mode terminal being in an RRC connected state, in which the report information is configured to indicate that there is the measurement result to be reported at the multi-mode terminal.

In an embodiment, the second sending module 154 is further configured such that the report information is further configured to indicate the measurement information included in the measurement result.

In an embodiment, the second sending module 154 is further configured to:

send the measurement result to the base station in response to receiving an acquisition request sent by the base station for requesting the multi-mode terminal to send the measurement result;

the acquisition request includes at least one measurement information in the measurement result that the base station needs to acquire.

In an embodiment, the second receiving module 151 is further configured such that the configuration information includes indicating at least one of:

a measurement object, the measurement object including a satellite, a satellite cell and/or a satellite frequency band;

measurement time;

a measurement area;

a signal parameter required to be measured; and information required to be recorded, the information required to be recorded including: a measured duration in which the multi-mode terminal is covered by the satellite cell and/or a measured coverage range of the satellite cell.

With regard to the apparatus in the above embodiments, the specific way in which each module performs the operation has been described in detail in the embodiments of the method and will not be elaborated here.

A communication device is provided in embodiments of the disclosure. The communication device includes:

a processor; and a memory configured to store instructions executable by the processor;

in which, the processor is configured to: implement the method described in any embodiment of the disclosure when running the executable instructions.

The processor may include various types of storage mediums. The storage medium is a non-transitory computer storage medium, and may continue memorizing and storing information thereon when the communication device is powered off.

The processor may be connected to the memory via a bus, and may be configured to read an executable program stored on the memory.

A computer storage medium stored with a computer executable program is further provided in embodiments of the present disclosure. The executable program implements the method as described in any embodiment of the disclosure when executed by a processor.

With regard to the apparatus in the above embodiments, the specific way in which each module performs the operation has been described in detail in the embodiments of the method and will not be elaborated here.

Figure 16:
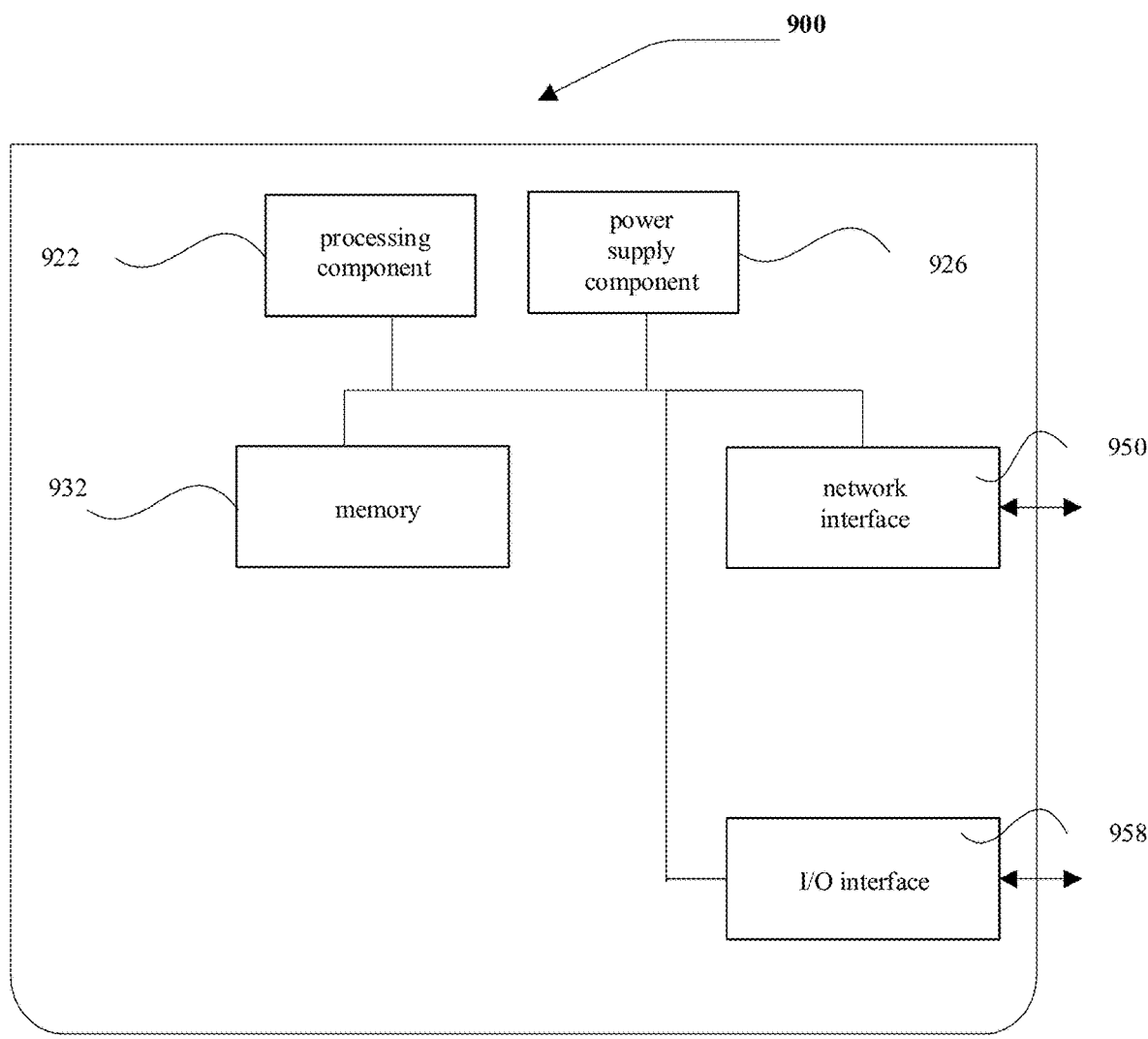
FIG. 16 is a block diagram illustrating a base station according to an embodiment.

FIG. 16 is a block diagram illustrating a structure of a base station according to an embodiment of the disclosure. For example, the base station 900 may be provided as a network side server. As illustrated in FIG. 16, the base station 900 includes a processing component 922, which further include one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to perform any one method applied to the base station as described in the above method.

In embodiments of the present disclosure, a measurement configuration signaling is sent to a multi-mode terminal; in which, the measurement configuration signaling includes configuration information for the multi-mode terminal to measure a satellite network. In this way, the multi-mode terminal may acquire the measurement result associated with the satellite network by measuring the satellite network based on the configuration information, after receiving the measurement configuration signaling. The measurement result may be used for the base station to adjust a signal coverage of the satellite network, so that the signal coverage of the satellite network is enhanced, and the multi-mode terminal has a better wireless communication quality.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure.

It should be understood that the present disclosure is not limited to the precise structure described above and shown in the drawings, and various modifications and changes may be made without departing from its scope.

What is claimed is:

1. A method for measuring a satellite network, performed by a base station, comprising:
   sending a measurement configuration signaling to a multi-mode terminal; wherein, the measurement configuration signaling comprises configuration information for the multi-mode terminal to measure the satellite network;
   receiving report information sent by the multi-mode terminal, wherein, the report information is configured to indicate that there is a measurement result to be reported at the multi-mode terminal; the measurement result is a result acquired by the multi-mode terminal measuring the satellite network using the configuration information; and
   sending an acquisition request for requesting the multi-mode terminal to send the measurement result to the multi-mode terminal, in response to receiving the report information sent by the multi-mode terminal, wherein, the acquisition request comprises at least one measurement information in the measurement result that needs to be acquired.

2. The method of claim 1, wherein, the report information is further configured to indicate measurement information comprised in the measurement result.

3. The method of claim 1, further comprising:
   receiving the measurement result sent by the multi-mode terminal for the acquisition request.

4. The method of claim 3, further comprising:
   adjusting a signal coverage of the satellite network based on the measurement result.

5. The method of claim 1, wherein, the configuration information comprises indicating at least one of:
   a measurement object, wherein, the measurement object comprises at least one of the following: a satellite, a satellite cell or a satellite frequency band;
   measurement time;
   a measurement area;
   a signal parameter required to be measured; and
   information required to be recorded, wherein, the information required to be recorded comprises at least one of the following: a measured duration in which the multi-mode terminal is covered by a satellite cell or a measured coverage range of a satellite cell.

6. A method for measuring a satellite network, performed by a multi-mode terminal, comprising:
   receiving a measurement configuration signaling sent by a base station; wherein, the measurement configuration signaling comprises configuration information for the multi-mode terminal to measure the satellite network;
   acquiring a measurement result by measuring the satellite network using the configuration information;
   storing the measurement result based on a storage parameter comprised in the configuration information;
   sending report information to the base station, in response to the multi-mode terminal being in a radio resource control (RRC) connected state, wherein, the report information is configured to indicate that there is the measurement result to be reported at the multi-mode terminal; and
   sending the measurement result to the base station, in response to receiving an acquisition request sent by the base station for requesting the multi-mode terminal to send the measurement result;
   wherein, the acquisition request comprises at least one measurement information in the measurement result that needs to be acquired by the base station.

7. The method of claim 6, wherein, measuring the satellite network using the configuration information, comprises:
   measuring the satellite network using the configuration information, in response to the multi-mode terminal being in a radio resource control (RRC) idle state or an RRC inactive state.

8. The method of claim 6, wherein, the report information is further configured to indicate measurement information comprised in the measurement result.

9. The method of claim 6, wherein, the configuration information comprises indicating at least one of:
   a measurement object, wherein, the measurement object comprises at least one of the following: a satellite, a satellite cell or a satellite frequency band;
   measurement time;
   a measurement area;
   a signal parameter required to be measured; and
   information required to be recorded, wherein, the information required to be recorded comprises at least one of the following: a measured duration in which the multi-mode terminal is covered by a satellite cell or a measured coverage range of a satellite cell.

10. A multi-mode terminal, comprising:
    a processor; and
    a memory configured to store instructions executable by the processor;
    wherein, the processor is configured to:
    receive a measurement configuration signaling sent by a base station; wherein, the measurement configuration signaling comprises configuration information for the multi-mode terminal to measure the satellite network;
    acquire a measurement result by measuring the satellite network using the configuration information;
    store the measurement result based on a storage parameter comprised in the configuration information;
    send report information to the base station, in response to the multi-mode terminal being in a radio resource control (RRC) connected state, wherein, the report information is configured to indicate that there is the measurement result to be reported at the multi-mode terminal; and
    send the measurement result to the base station, in response to receiving an acquisition request sent by the base station for requesting the multi-mode terminal to send the measurement result;

wherein, the acquisition request comprises at least one measurement information in the measurement result that needs to be acquired by the base station.

11. The multi-mode terminal of claim 10, wherein the processor is configured to:
measure the satellite network using the configuration information, in response to the multi-mode terminal being in a radio resource control (RRC) idle state or an RRC inactive state.

* * * * *